US012801904B2

(12) United States Patent
Lee et al.

(10) Patent No.: US 12,801,904 B2
(45) Date of Patent: Nov. 17, 2026

(54) ELECTRONIC DEVICE INCLUDING ACCELERATOR FOR PROCESSING FUNCTION AND METHOD OF CONTROLLING THE ELECTRONIC DEVICE

(71) Applicant: SAMSUNG ELECTRONICS CO., LTD., Suwon-si (KR)

(72) Inventors: Jonghun Lee, Suwon-si (KR); Chulsoo Park, Suwon-si (KR); Cheolgyu Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 390 days.

(21) Appl. No.: 18/647,814

(22) Filed: Apr. 26, 2024

(65) Prior Publication Data

US 2024/0428059 A1 Dec. 26, 2024

Related U.S. Application Data

(63) Continuation of application No. PCT/KR2024/003621, filed on Mar. 22, 2024.

(30) Foreign Application Priority Data

Jun. 20, 2023 (KR) ........................ 10-2023-0078853

(51) Int. Cl.
*G06N 3/048* (2023.01)
*G06N 3/063* (2023.01)

(52) U.S. Cl.
CPC ............. *G06N 3/048* (2023.01); *G06N 3/063* (2013.01)

(58) Field of Classification Search
CPC ............................... G06N 3/048; G06N 3/063
See application file for complete search history.

(56) References Cited

U.S. PATENT DOCUMENTS 11,004,500 B2 5/2021 Troia
11,468,147 B1 10/2022 Hofer et al.
(Continued)

FOREIGN PATENT DOCUMENTS

CN 115169546 A * 10/2022 ............... G06F 7/50
CN 115936076 A 4/2023
(Continued)

OTHER PUBLICATIONS

Alberto Marchisio et al. "SwiftTron: An Efficient Hardware Accelerator for Quantized Transformers", 2023 International Joint Conference on Neural Networks (IJCNN), 9 pages. (Year: 2023).*
(Continued)

*Primary Examiner* — G. C. Neurauter, Jr.
(74) *Attorney, Agent, or Firm* — Sughrue Mion, PLLC

(57) ABSTRACT

An electronic device includes: a neural processing unit (NPU) configured to process an activation function; and an accelerator in the NPU, wherein the accelerator includes: a function processing block including at least one sub-operation block, and a final output block connected to the function processing block, wherein the at least one sub-operation block includes: a first sub-operation block configured to calculate an approximation output value for the activation function by processing the activation function based on a first point number and a first bit resolution, and a second sub-operation block configured to calculate a detailed output value for the activation function by processing the activation function based on a second point number and a second bit resolution, and wherein the final output block is configured to calculate a final output value corresponding to the activation function based on the approximation output value and the detailed output value.

20 Claims, 18 Drawing Sheets

(56) References Cited

U.S. PATENT DOCUMENTS

| | | | | |
|---|---|---|---|---|
| 11,604,987 | B2 * | 3/2023 | Van Baalen | G06N 3/063 |
| 11,645,493 | B2 * | 5/2023 | Burger | G06F 17/16 706/23 |
| 11,742,875 | B1 * | 8/2023 | Kuo | G06F 9/5027 341/50 |
| 11,755,901 | B2 * | 9/2023 | Deisher | G06F 5/01 708/208 |
| 11,783,200 | B2 * | 10/2023 | Diamantopoulos | G06N 3/04 706/25 |
| 12,001,955 | B2 * | 6/2024 | Liu | G06N 3/063 |
| 12,112,257 | B2 * | 10/2024 | Liu | G06N 3/045 |
| 12,165,039 | B2 * | 12/2024 | Liu | G06N 3/0464 |
| 12,518,148 | B2 * | 1/2026 | Liu | G06N 3/0464 |
| 12,585,926 | B2 * | 3/2026 | Darvish Rouhani | G06N 3/063 |
| 2016/0328646 | A1 * | 11/2016 | Lin | G06N 3/045 |
| 2019/0180182 | A1 | 6/2019 | Loh | |
| 2019/0340499 | A1 * | 11/2019 | Burger | G06N 3/063 |
| 2021/0294784 | A1 | 9/2021 | Ihor et al. | |
| 2022/0383103 | A1 | 12/2022 | Park et al. | |
| 2023/0078569 | A1 | 3/2023 | Wang et al. | |
| 2023/0083597 | A1 | 3/2023 | Mohan et al. | |

FOREIGN PATENT DOCUMENTS

| | | | | | |
|---|---|---|---|---|---|
| CN | 118586463 | A | * | 9/2024 | G06N 3/048 |
| KR | 10-2020-0086708 | A | | 7/2020 | |
| KR | 10-2021-0116182 | A | | 9/2021 | |
| KR | 10-2368074 | B1 | | 2/2022 | |

OTHER PUBLICATIONS

Jonathan W. Siegel et al., "Approximation rates for neural networks with general activation functions", Neural Networks, Department of Mathematics, Pennsylvania State University, vol. 128, Aug. 2020, pp. 313-321, https://doi.org/10.1016/j.neunet.2020.05.019.

International Search Report (PCT/ISA/210) issued by the International Searching Authority on Jun. 24, 2024 in corresponding International Application No. PCT/KR2024/003621.

A. Howard, et al., "Searching for MobileNetV3", in 2019 IEEE/CVF International Conference on Computer Vision (ICCV), May 2019, pp. 1314-1324, doi: 10.1109/ICCV.2019.00140.

Sehoon Kim, et al., "I-BERT: Integer-only BERT Quantization", Jun. 8, 2021, 15 pages, arXiv:2101.01321v3 [cs.CL].

Zhikai Li, et al., "I-ViT: Integer-only Quantization for Efficient Vision Transformer Inference", Jul. 4, 2022, 6 pages, arXiv:2207.01405v1 [cs.CV].

* cited by examiner

ELECTRONIC DEVICE INCLUDING ACCELERATOR FOR PROCESSING FUNCTION AND METHOD OF CONTROLLING THE ELECTRONIC DEVICE

CROSS-REFERENCE TO RELATED APPLICATIONS

This application is a by-pass continuation application of International Application No. PCT/KR2024/003621, filed on Mar. 22, 2024, which is based on and claims priority to Korean Patent Application No. 10-2023-0078853, filed on Jun. 20, 2023, in the Korean Intellectual Property Office, the disclosures of which are incorporated by reference herein their entireties.

BACKGROUND

1. Field

The disclosure relates to an electronic device including an accelerator for processing a function and a method of controlling the electronic device.

2. Description of Related Art

Electronic devices such as a television (TV), a portable terminal and a home appliance may include at least one processor that employs artificial intelligence (AI). The at least one processor may include a neural processing unit (NPU) that uses a neural network (NN). The NPU may control an operation of the electronic device by processing an input function.

The input function to the NPU may include or correspond to an activation function. The activation function may define an output of the NPU for an input. The activation function may include a non-linear function such as a sigmoid function, a hyperbolic tangent (tan h) function, a rectified linear unit (ReLU) function, an exponential linear unit (ELU) function, or a Gaussian error linear unit (GELU) function.

Recently, on-device AI for the electronic device itself to process an input function is used and the NPU may include an accelerator to enhance efficiency of an operation of the input function.

As there are many different computation methods for a case that the activation function is a non-linear function, there may be a need for an operation block, which is separate from the accelerator, in order to process the input function. Hence, a size and complexity of the processor of the electronic device may increase because the processor includes the extra operation block.

SUMMARY

According to an aspect of the disclosure, a neural processing unit (NPU) configured to process an activation function; and an accelerator in the NPU, wherein the accelerator includes: a function processing block including at least one sub-operation block, and a final output block connected to the function processing block, wherein the at least one sub-operation block includes: a first sub-operation block configured to calculate an approximation output value for the activation function by processing the activation function based on a first point number and a first bit resolution, and a second sub-operation block configured to calculate a detailed output value for the activation function by processing the activation function based on a second point number and a second bit resolution, and wherein the final output block is configured to calculate a final output value corresponding to the activation function based on the approximation output value and the detailed output value.

According to an aspect of the disclosure, a method of controlling an electronic device including a function processing block and a final output block, the method includes: calculating, by controlling a first sub-operation block of at least one sub-operation block in the function processing block, an approximation output value for an activation function by processing the activation function based on a first point number and a first bit resolution; calculating, by controlling a second sub-operation block of the at least one sub-operation block, a detailed output value for the activation function by processing the activation function based on a second point number and a second bit resolution; and calculating, by controlling the final output block, a final output value corresponding to the activation function based on the approximation output value and the detailed output value.

According to an aspect of the disclosure, a non-transitory recording medium having at least one instruction stored therein to control an electronic device including a function processing block and a final output block, the at least one instruction for causing the electronic device to perform operations of: calculating, by controlling a first sub-operation block of at least one sub-operation block in the function processing block, an approximation output value for an activation function by processing the activation function based on a first point number and a first bit resolution; calculating, by controlling a second sub-operation block of the at least one sub-operation block, a detailed output value for the activation function by processing the activation function based on a second point number and a second bit resolution; and calculating, by controlling the final output block, a final output value corresponding to the activation function based on the approximation output value and the detailed output value.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
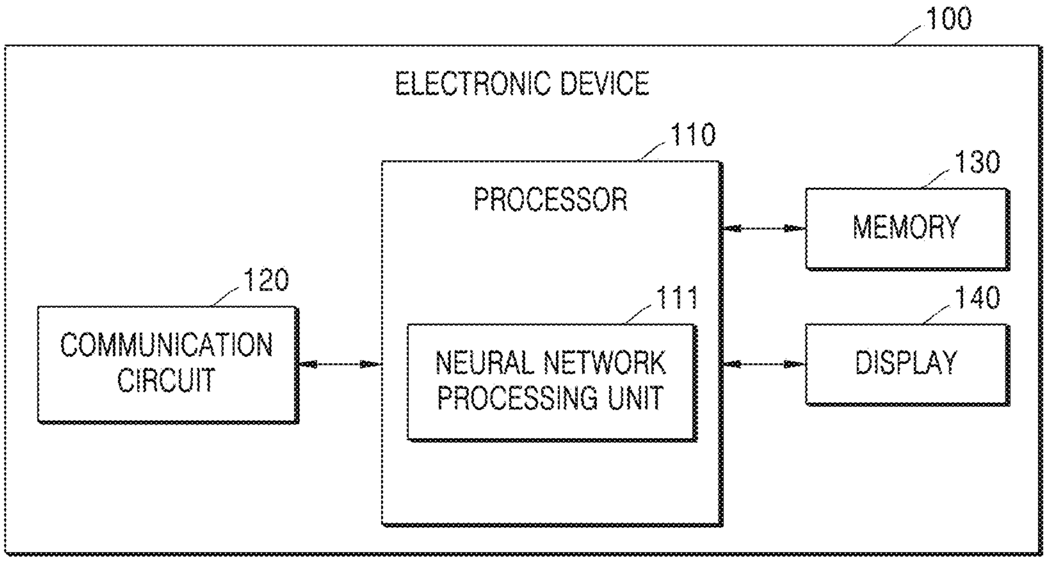
FIG. 1 illustrates an electronic device, according to an embodiment of the disclosure.

Terms as used herein will be described before detailed description of embodiments of the disclosure.

The terms are selected as common terms that are currently widely used, taking into account principles of the disclosure, which may however depend on intentions of those of ordinary skill in the art, judicial precedents, emergence of new technologies, and the like. Some terms as herein used are selected at the applicant's discretion, in which case, the terms will be explained later in detail in connection with embodiments of the disclosure. Therefore, the terms should be defined based on their meanings and descriptions throughout the disclosure.

The term "include (or including)" or "comprise (or comprising)" is inclusive or open-ended and does not exclude additional, unrecited elements or method steps. The terms "unit", "module", "block," as used herein, may be implemented by a program that is stored in a storage medium which may be addressed, and is executed by a processor. For example, a "unit", a "module", a "block" may be implemented by components such as software components, object-oriented software components, class components, and task components, processes, functions, attributes, procedures, sub-routines, segments of a program code, drivers, firmware, a micro code, a circuit, data, a database, data structures, tables, arrays and parameters.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

An embodiment of the disclosure will now be described in detail with reference to accompanying drawings to be readily practiced by those of ordinary skill in the art. However, the embodiment of the disclosure may be implemented in many different forms, and not limited thereto as will be discussed herein. In the drawings, parts unrelated to the description are omitted for clarity, and like numerals refer to like elements throughout the specification.

An electronic device and method for controlling the same according to the disclosure has an objective to reduce the size and complexity of a processor by providing an accelerator for processing a non-linear activation function.

FIG. 1 is a block diagram illustrating an electronic device 100, according to an embodiment of the disclosure. The electronic device 100 may process input information and performing a function corresponding to the input. For example, the electronic device 1000 may include an image display device, a mobile terminal, and a home appliance. For example, the electronic device 1000 may be at least one of a television (TV), a smart phone, a tablet, an air conditioner, a washing machine, or a cleaner. In an embodiment of the disclosure, the electronic device 100 may include a processor (at least one processor) 110, a communication circuit 120, a memory (at least one memory) 130 and a display 140.

In an embodiment of the disclosure, the processor 110 may control general operation of the electronic device 100. The processor 110 may load at least one instruction stored in the memory 130 to control an operation of the electronic device 100. The processor 110 may perform various data processing or operation to control the communication circuit 120 and the display 140. The processor 110 may include at least one of a central processing unit (CPU), an application processor (AP), a graphic processing unit (GPU), or an image signal processor (ISP).

In an embodiment of the disclosure, the processor 110 may include a neural processing unit (NPU) 111. The NPU 111 may include a neural network (NN) that receives and transmits signals through a plurality of nodes on various paths. The NPU 111 may train the NN. The NPU 111 may perform an operation to train the NN based on input information. The NPU 111 may perform repetitive training in such a method as machine learning (ML). The NPU 111 may analyze input data by using the trained NN. The NPU 111 may allow the processor 110 to use a result of analyzing the input data. The processor 110 may embody artificial intelligence (AI) by using the result of the analyzing.

In an embodiment of the disclosure, the communication circuit 120 may allow the electronic device 100 to perform communication connection with an external electronic device or a server. The communication circuit 120 may include at least one communication processor (CP) to support wireless communication. The communication circuit 120 may establish a wired or wireless communication channel between the electronic device 100 and the external electronic device or the server. The communication circuit 120 may send a signal to notify establishment of the wired or wireless communication channel to the processor 110. The communication circuit 120 may receive a signal to permit establishment of the wired or wireless communication channel from the processor 110. The processor 110 may determine whether to permit establishment of the wired or wireless communication channel based on the result of the analyzing by the NPU 111.

In an embodiment of the disclosure, the communication circuit 120 may support the electronic device 100 to transmit and receive signals or data to and from the external electronic device or the server on the established wired or wireless communication channel. For example, when the electronic device 100 is an image display device, the communication circuit 120 may establish a wired or wireless communication channel with the external electronic device or the server and receive image data from the external electronic device or the server. For example, when the electronic device 100 is a mobile terminal, the communication circuit 120 may establish a wireless communication channel between the electronic device 100 and the external electronic device, and make a call or transmit or receive a message on the established wireless communication channel. For example, when the electronic device 100 is a home appliance, the communication circuit 120 may be connected to the external electronic device through short-range wireless communication such as Bluetooth low energy (BLE) communication and connected to the server through long-range wireless communication such as wireless fidelity (Wi-Fi) communication.

In an embodiment of the disclosure, the memory 130 may include at least one type storage medium of a flash memory, a hard disk, a multimedia card micro type memory, a card type memory (e.g., secure digital (SD) or extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, or an optical disk. The memory 130 may receive a command or data from the processor 110. The memory 130 may store the instruction or data received from the processor 110. The instruction or data stored in the memory 130 may include a program for the processor 110 to process input data and control an operation of the electronic device 100. The processor 110 may load the instruction or data stored in the memory 130. The processor 110 may analyze or process the instruction or data loaded from the memory 130 by using the NPU 111.

In an embodiment of the disclosure, the display 140 may provide visual information to the outside of the electronic device 100. For example, the display 140 may display a screen related to information about a state of the electronic device 100. For example, the display 140 may display a screen related to an operation or function performed by the electronic device 100. The processor 110 may send image data related to a result of analyzing by the NPU 111 to the display 140. The display may include a display panel for displaying a screen and a display driver integrated (DDI) circuit for driving the display panel. For example, the display 140 may be at least one of an organic light emitting display (OLED), a quantum dot (QD) display or a micro light emitting diode (LED) display.

Figure 2:
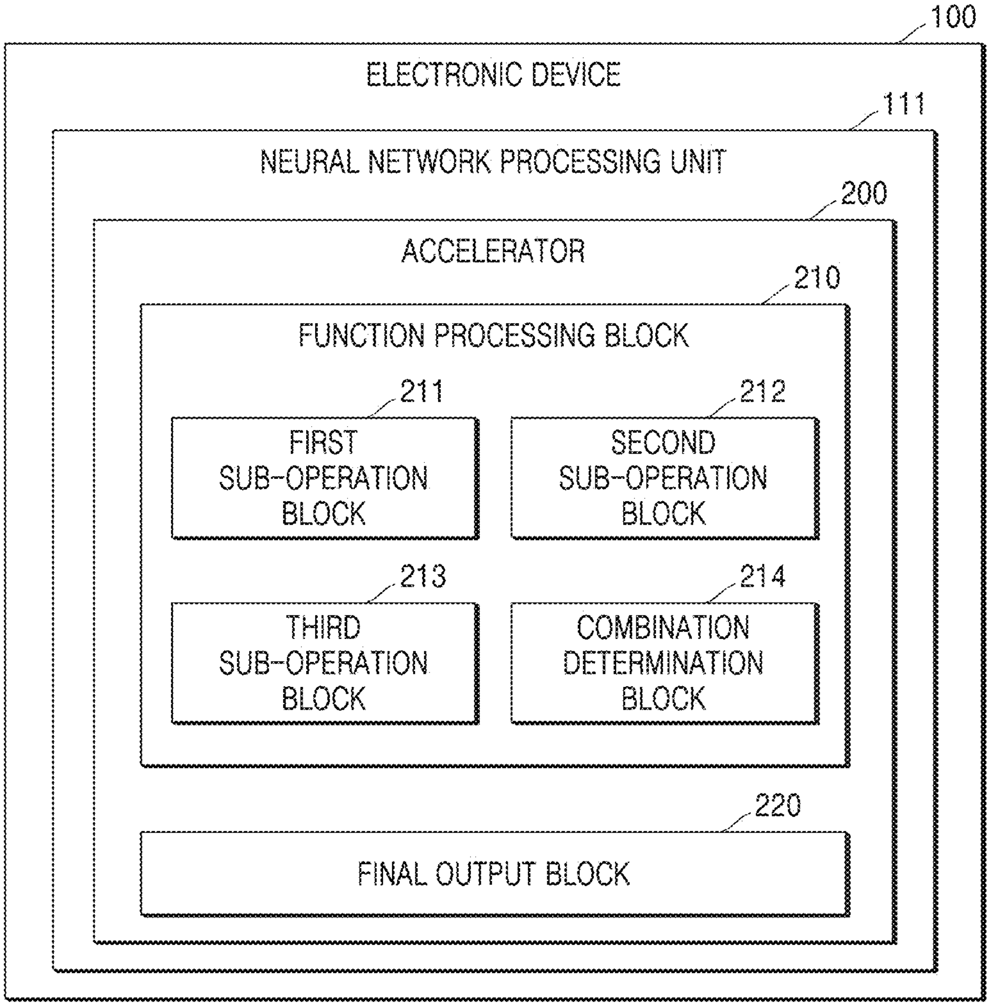
FIG. 2 illustrates an electronic device, according to an embodiment of the disclosure.

FIG. 2 is a block diagram illustrating the electronic device 100, according to an embodiment of the disclosure. The electronic device 100 may include the NPU 111.

In an embodiment of the disclosure, the NPU 111 may receive an activation function. The activation function may define an output of the NPU for an input. For example, the activation function may determine intensity of an output signal corresponding to a signal input to a node of the NN. The activation function may include a non-linear function such as a sigmoid function, a hyperbolic tangent (tan h) function, a rectified linear unit (ReLU) function, an exponential linear unit (ELU) function, or a Gaussian error linear unit (GELU) function.

In an embodiment of the disclosure, the NPU 111 may process the input activation function. The NPU 111 may control operation of the electronic device 100 by processing an input function. The NPU 111 may calculate at least one result value related to an operation of the electronic device 100 by processing the activation function. The NPU 111 may include an accelerator 200.

In an embodiment of the disclosure, the accelerator 200 may be an auxiliary operation device of the electronic device 100 that employs AI. For example, the accelerator 200 may be the auxiliary operation device used in the electronic device 100 that includes the NPU 111 to train data in a machine learning or deep leaning method. The accelerator 200 may increase efficiency of an operation performed by the NPU 111. For example, the accelerator 200 may reduce a total amount of data to be used in an operation procedure for processing an input function in the NPU 111. The accelerator 200 may increase speed of the machine learning. The NPU 111 may enhance efficiency of an operation of an input function by using the accelerator 200. Especially, when on-device AI is applied to the electronic device 100 to process an input function, the NPU 111 may need to use the accelerator 200 to easily operate and process the input function. The accelerator 200 may include the function processing block 210 and the final output block 220.

In an embodiment of the disclosure, the function processing block 210 may be included in the NPU 111. The function processing block 210 may generate an output value by using stored information. For example, the function processing block 210 may generate at least one output value by using points. The function processing block 210 may include at least one sub-operation block (e.g., the first sub-operation block 211 and the second sub-operation block 212). For example, the function processing block 210 may include a first sub-operation block 211 and a second sub-operation block 212. However, the number of the sub-operation blocks included in the function processing block 210 is not limited thereto. Hence, the function processing block 210 may include one sub-operation block or three or more sub-operation blocks.

In an embodiment of the disclosure, the first sub-operation block 211 may process the activation function based on a first point number and a first bit resolution. The first sub-operation block 211 may calculate an approximation output value for the activation function.

In an embodiment of the disclosure, the second sub-operation block 212 may process the activation function based on a second point number and a second bit resolution. The second sub-operation block 212 may calculate a detailed output value for the activation function.

In an embodiment of the disclosure, the final output block 220 may be connected to the function processing block 210. The final output block 220 may include a selection block and an adder. For example, the selection block included in the final output block 220 may be a multiplexer MUX. The final output block 220 may select or combine at least one output value of the function processing block 210. The adder included in the final output block 220 may generate a final output by combining an output of the first sub-operation block 211 and an output of the second sub-operation block 212 included in the function processing block 210. The selection block included in the final output block 220 may bypass the output of the first sub-operation block 211 or the output of the second sub-operation block 212, or select one of the outputs of the adder as a final output, according to a given setting. For example, the final output block 220 may select an output value of the first sub-operation block 211. For example, the final output block 220 may calculate a final output value by combining the output value of the first sub-operation block 211 and the output value of the second sub-operation block 212.

In an embodiment of the disclosure, the final output block 220 may output a result of selecting or combining the at least one output value as a final output value. The final output block 220 may calculate a final output value corresponding to the activation function based on the approximation output value and the detailed output value. For example, when the adder of the final output block 220 is used, the final output block 220 may reserve bit places separate from the output values of the first and second sub-operation blocks 211 and 212 to maintain accuracy of the final output. For example, the final output block 220 may generate a final output by a shift operation after combining the output values of the first and second sub-operation blocks 211 and 212.

Figure 3A:
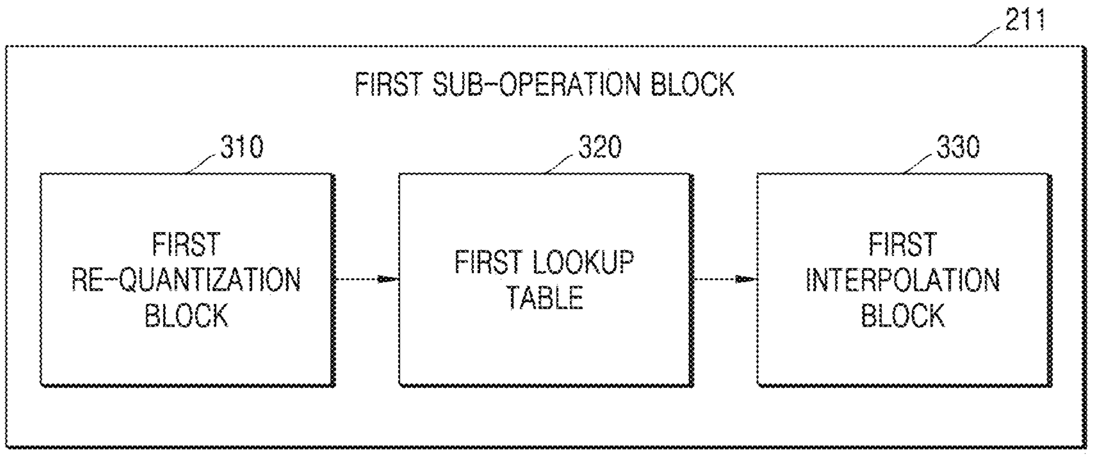
FIG. 3A illustrates a first sub-operation block of an electronic device, according to an embodiment of the disclosure.
Figure 3B:
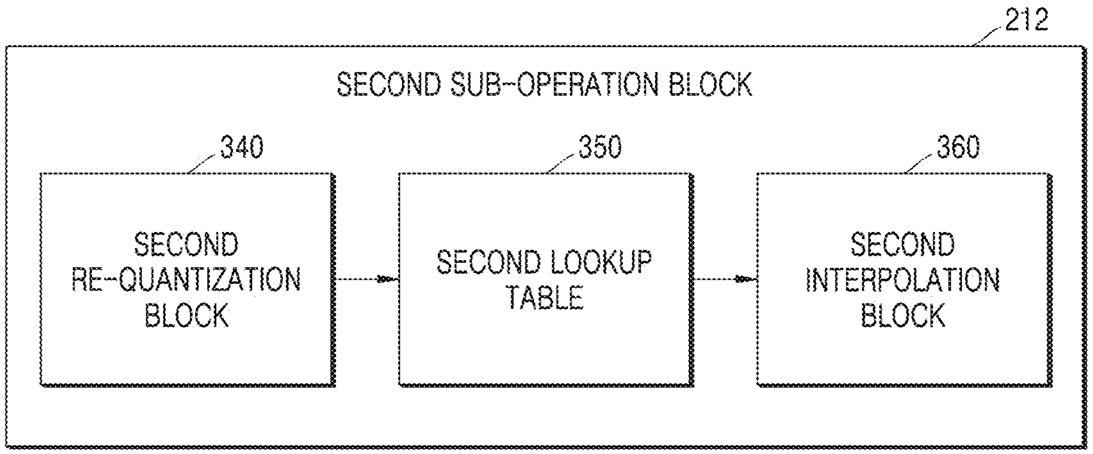
FIG. 3B illustrates a second sub-operation block of an electronic device, according to an embodiment of the disclosure.

FIG. 3A is a block diagram illustrating the first sub-operation block 211 of the electronic device 100, according to an embodiment of the disclosure. FIG. 3B is a block diagram illustrating the second sub-operation block 212 of the electronic device 100, according to an embodiment of the disclosure. The first sub-operation block 211 may include a first re-quantization (ReQ) block 310, a first lookup table (LUT) 320, and a first interpolation block 330. The second sub-operation block 212 may include a second ReQ block 340, a second LUT 350, and a second interpolation block 360.

In an embodiment of the disclosure, the first ReQ block 310 may perform an ReQ procedure for a function input to the first sub-operation block 211. The ReQ procedure may perform quantization in a designated range. For example, the ReQ procedure may obtain an output value for an input activation function in a range between a minimum value and a maximum value. The ReQ procedure may include a method of adjusting the quantization range. The ReQ procedure may reduce the chances of setting an unnecessarily excessive quantization section and performing quantized representation on data in an actually unused range in a procedure for performing quantization. The ReQ procedure may avoid a situation of setting a quantization section too narrowly to represent data in an actually used range. Hence, the first ReQ block 310 may increase speed of obtaining an output value for an activation function input to the first sub-operation block 211 as well as improve accuracy of the output value for the activation function.

In an embodiment of the disclosure, the first LUT 320 may store a plurality of output values corresponding to a plurality of input values. The first LUT 320 may store as many input values as the number determined based on a first point number and a first bit resolution. For example, the first point number may be 2. For example, the first bit resolution may be 24 bits. When one of the plurality of input values is input, the first LUT 320 may output an output value for the input value.

In an embodiment of the disclosure, the first interpolation block 330 may perform an interpolation operation on the input value. The interpolation operation may be an approximation operation. The interpolation operation may estimate a medium input value among the plurality of known input values based on the plurality of input values. The interpolation operation may include a linear interpolation operation. The first interpolation block 330 may calculate an output value corresponding to an input point value not stored in the first LUT 320 by performing an interpolation operation such as the linear interpolation operation. The first interpolation block 330 may calculate an output value corresponding to an input point value by using two input values closest to the input point value among the plurality of input values stored in the first LUT 320.

In an embodiment of the disclosure, the second ReQ block 340 may perform an ReQ procedure for a function input to the second sub-operation block 212. The ReQ procedure may perform quantization in a designated range. For example, the ReQ procedure may obtain an output value for an input activation function in a range between a minimum value and a maximum value. The ReQ procedure may include a method of adjusting the quantization range. The ReQ procedure may reduce the chances of setting an unnecessarily excessive quantization section and performing quantized representation on data in an actually unused range in a procedure for performing quantization. The ReQ procedure may avoid a situation of setting a quantization section too narrowly to represent data in an actually used range. Hence, the second ReQ block 340 may increase speed of obtaining an output value for an activation function input to the second sub-operation block 212 as well as improve accuracy of the output value for the activation function.

In an embodiment of the disclosure, the second LUT 350 may store a plurality of output values corresponding to a plurality of input values. The second LUT 350 may store as many input values as the number determined based on a second point number and a second bit resolution. The second point number may be larger than the first point number. The second bit resolution may be lower than the first bit resolution. For example, the second point number may be 256. For example, the second bit resolution may be 8 bits. When one of the plurality of input values is input, the second LUT 350 may output an output value corresponding to the input value.

In an embodiment of the disclosure, the second interpolation block 360 may perform an interpolation operation on the input value. The interpolation operation may be an approximation operation. The interpolation operation may estimate a medium input value among the plurality of known input values based on the plurality of input values. The interpolation operation may include a linear interpolation operation. The second interpolation block 360 may calculate an output value corresponding to an input point value not stored in the second LUT 350 by performing an interpolation operation such as the linear interpolation operation. The second interpolation block 360 may calculate an output value corresponding to an input point value by using two input values closest to the input point value among the plurality of input values stored in the second LUT 350.

Figure 4:
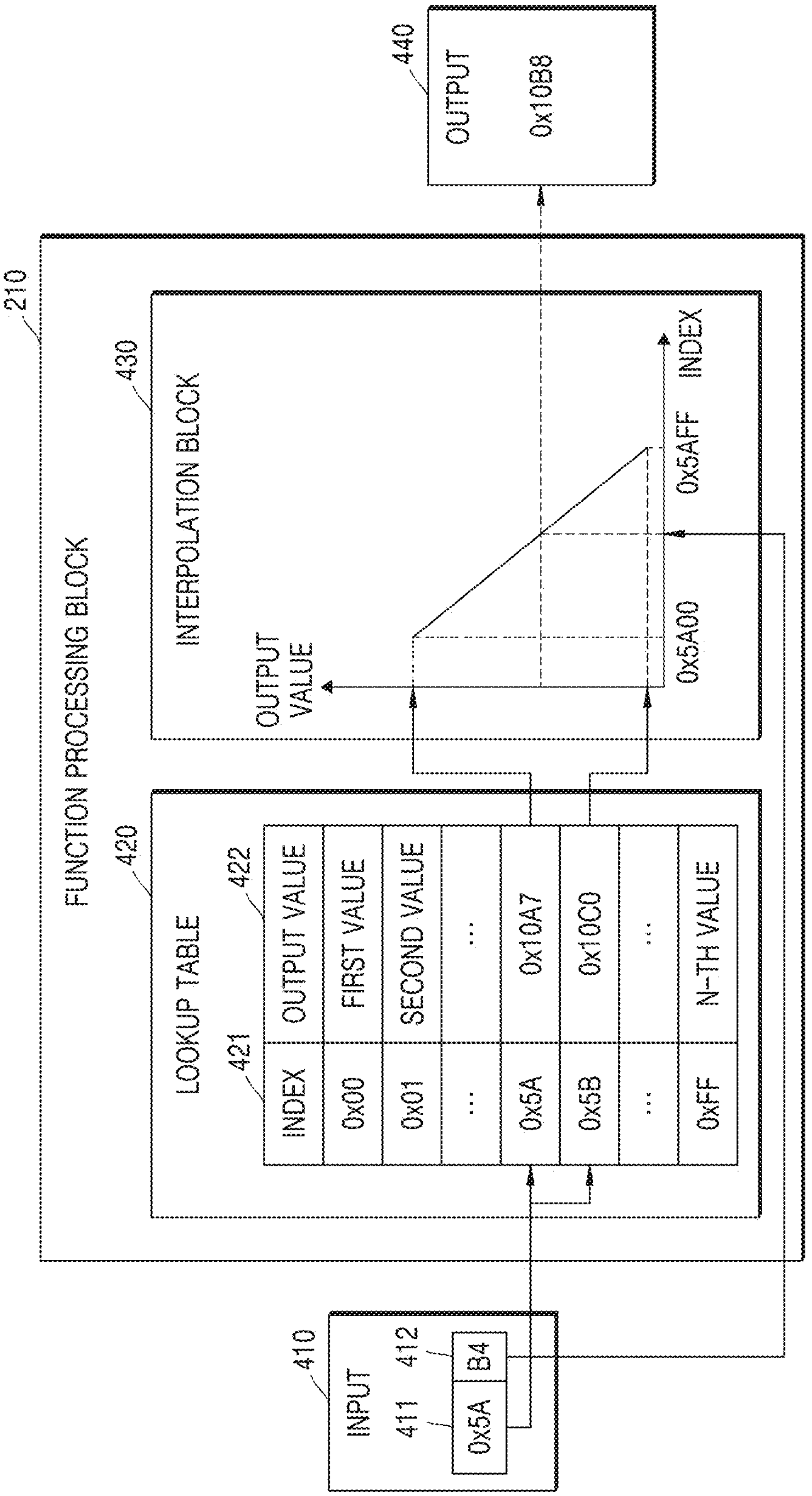
FIG. 4 illustrates a procedure in which a function processing block of an electronic device generates an output by processing an input, according to an embodiment of the disclosure.

FIG. 4 illustrates a procedure in which the function processing block 210 of the electronic device 100 generates an output 440 by processing an input 410, according to an embodiment of the disclosure. The function processing block 210 may include an LUT 420 and an interpolation block 430.

In an embodiment of the disclosure, the function processing block 210 may receive the input 410. The input 410 may have digit places and designated bit values according to a designated bit resolution. The input 410 may include a higher bit value 411 and a lower bit value 412. For example, in a case that the input 410 has six bits, the higher bit value 411 may be four bits in higher digit places. For example, in the case that the input 410 has six bits, the lower bit value 412 may be two bits in lower digit places. For example, in a case that the input 410 has a bit value of 0x5AB4, the higher bit value 411 may be 0x5A and the lower bit value 412 may be B4.

In an embodiment of the disclosure, the function processing block 210 may send the input 410 to the LUT 420. The LUT 420 may store a plurality of index values 421 and a plurality of output values 422. The plurality of index values 421 may include a plurality of bits to correspond to a bit resolution of the function processing block 210. For example, in a case that the bit resolution of the function processing block 210 is four bits, the plurality of index values 421 may include 0x00, 0x01, . . . , 0x5A, 0x5B, . . . , and 0xFF.

In an embodiment of the disclosure, when the bit resolution of the input 410 corresponds to a bit resolution of each of the plurality of index values 421 in the LUT 420, the function processing block 210 may generate an output 440 having the output value 422 corresponding to an index value corresponding to the input 410 among the plurality of index values 421. When the bit resolution of the input 410 corresponds to a bit resolution of each of the plurality of index values 421 in the LUT 420, the function processing block 210 may generate the output 440 having the output value 422 without an interpolation operation.

In an embodiment of the disclosure, when the bit resolution of the input 410 is higher than a bit resolution of each of the plurality of index values 421 in the LUT 420, the function processing block 210 may determine the same index value among the plurality of index values 421 in the LUT 420 based on the higher bit value 411 of the input 410. For example, when the bit resolution of the input 410, 0x5aB4 is 6 bits, which is larger than the bit resolution, which is 4 bits, of each of the plurality of index values 421 in the LUT 420, the function processing block 210 may select 0x5A and 0x5B from among the plurality of index values 421 in the LUT 420 based on the higher bit value 411 0x5A and determine the output value 422 for the output 440 to be 0x10A7 and 0x10C0.

In an embodiment of the disclosure, when the bit resolution of the input 410 is higher than a bit resolution of each of the plurality of index values 421 in the LUT 420, the function processing block 210 may perform an interpolation operation based on the lower bit value 412 of the input 410. The function processing block 210 may perform a piecewise linear interpolation operation by using an interpolation block 430. The piecewise linear interpolation may be an approximation operation that calculates a value included in a short section on the assumption that values change linearly in the short section. For example, based on the output value being 0x10A7 when the index value is 0x5A00 and the output value being 0x10C0 when the index value is 0x5AFF, a section between 0x5A00 and 0x5AFF may be linearly approximated. Accordingly, an output value may be calculated in the approximation function based on the lower bit value 412 of the input 410, 0x5AB4. The function processing block 210 may generate the output 440 based on the piecewise linear interpolation operation. For example, the function processing block 210 may generate the output 440, 0x10B8 corresponding to the input 410, 0x5AB4 based on the piecewise linear interpolation operation.

Figure 5A:
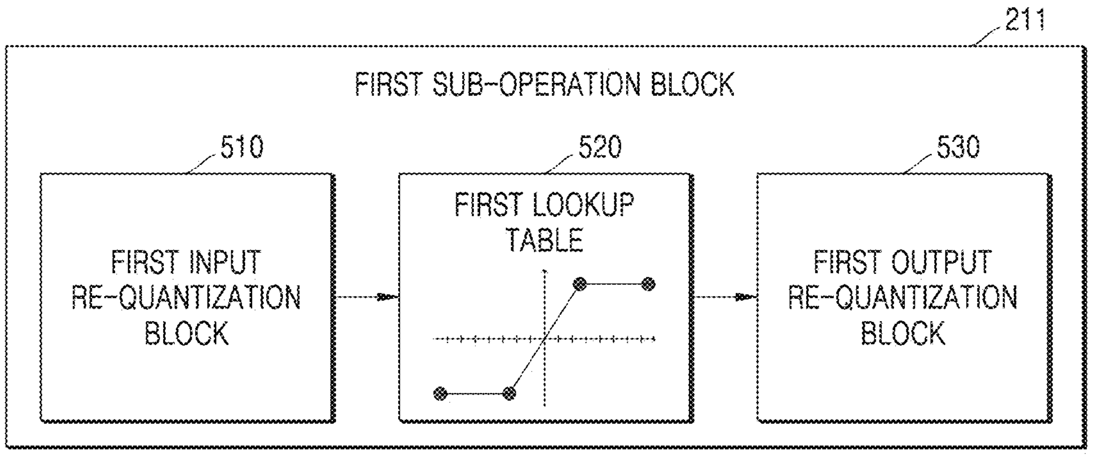
FIG. 5A illustrates a procedure in which a first sub-operation block of an electronic device processes an activation function, according to an embodiment of the disclosure.
Figure 5B:
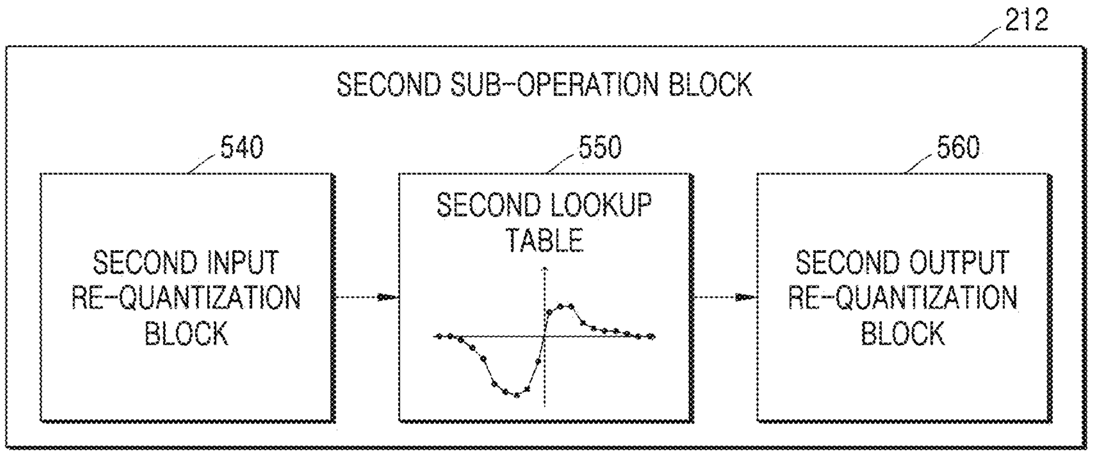
FIG. 5B illustrates a procedure in which a second sub-operation block of an electronic device processes an activation function, according to an embodiment of the disclosure.

FIG. 5A illustrates a procedure in which the first sub-operation block 211 of the electronic device 100 processes an activation function, according to an embodiment of the disclosure. FIG. 5B illustrates a procedure in which the second sub-operation block 212 of the electronic device 100 processes an activation function, according to an embodiment of the disclosure. The first sub-operation block 211 may process an activation function through a first input ReQ block 510, a first LUT 520, and a first output ReQ block 530. The second sub-operation block 212 may process an activation function through a second input ReQ block 540, a second LUT 550, and a second output ReQ block 560.

In an embodiment of the disclosure, the first input ReQ block 510 and the second input ReQ block 540 may adjust a scale of an input according to given point information. Re-quantization may include a procedure for adequately adjusting a quantization range Performing the re-quantization may avoid the chances of setting an unnecessarily wide quantization section and quantizing actually unused data or setting a too narrow quantization section to represent data in an actually used range.

In an embodiment of the disclosure, the first LUT 520 and the second LUT 550 may output a stored value corresponding to an input or generate an output value by performing piecewise linear interpolation operation according to input and output bit resolutions.

In an embodiment of the disclosure, the first output ReQ block 530 and the second output ReQ block 560 may re-quantize values output from the first LUT 520 and the second LUT 550 to fit a scale required by the accelerator 200.

In an embodiment of the disclosure, the first sub-operation block 211 and the second sub-operation block 212 may each configure the number of all the required points and a bit resolution of each point according to a property of an operator to be processed. For example, the first sub-operation block 211 may have the point number of two. For example, the input and the output of the first sub-operation block 211 may have a bit resolution of 24 bits. For example, the first sub-operation block 211 may process an ReQ function or a rectified linear unit (ReLU) function. For example, the first sub-operation block 211 may add one point to a portion having negative values on the X-axis. In the case that the first sub-operation block 211 adds one point to the negative portion on the X-axis, the first sub-operation block 211 may process a parametric ReLU (PReLU) function or a LeakyReLU function. For example, the second sub-operation block 212 may have the point number of 256. For example, the input and the output of the first sub-operation block 211 may have a bit resolution of 8 bits. The second sub-operation block 212 may process a non-linear activation function such as an ELU function or a GELU function.

In an embodiment of the disclosure, the function processing block 210 may store an approximated function by performing a linear operation on an input activation function in the first sub-operation block 211. In an embodiment of the disclosure, the function processing block 210 may store a difference between the input function and the approximated function in the second sub-operation block 212. Accordingly, the function processing block 210 may store the difference between the input function and the approximated function in the second sub-operation block 212 on a fine scale, thereby obtaining a more accurate output result in the whole input range of the input activation function.

In an embodiment of the disclosure, the function processing block 210 may further include an intermediate operation block in addition to the first sub-operation block 211 and the second sub-operation block 212. For example, the intermediate operation block may have the point number of 16. For example, the intermediate operation block may have a bit resolution of 16 bits. The intermediate operation block may perform a primary approximation operation process on a non-linear activation function. Accordingly, when the scale difference between the first sub-operation block 211 and the second sub-operation block 212 is big, the function processing block 210 may use the intermediate operation block to perform additional scaling, thereby further increasing accuracy of the output result.

In an embodiment of the disclosure, the first input ReQ block 510 and the second input ReQ block 540 may perform a rescaling operation. The rescaling operation may be embodied with multiply and shift operations.

In an embodiment of the disclosure, an approximation output value of the first sub-operation block 211 and the second sub-operation block 212 may have a relation of '2 to the power of 2' (2^2). For example, the first sub-operation block 211 may have a scale of '2 to the power of 2' (2^2), which is 4, and the second sub-operation block may have a scale of '2 to the power of 0,' which is 1. In the case that the approximation output value of the first sub-operation block 211 and the second sub-operation block 212 have a relation of '2 to the power of 2,' the multiply operation may not be used in performing the rescaling. In the case that the approximation output value of the first sub-operation block 211 and the second sub-operation block 212 have a relation of '2 to the power of 2,' the activation function may be embodied by combining output values of the first and second sub-operation blocks 211 and 212 with the shift operation. The relation between the approximation output value of the first sub-operation block 211 and the second sub-operation block 212 is not limited to the relation of '2 to the power of 2,' but the relation is that scale value of the first sub-operation block 211 is at least the scale value of the second sub-operation block 212.

In an embodiment of the disclosure, the first input ReQ block 510 and the second input ReQ block 540 may be each configured with the shift operation. Values on the X-axis of the activation function may be outputs of a linear layer such as a convolution CONV or matrix multiply MATMUL function. Accordingly, the first input ReQ block 510 and the second input ReQ block 540 may embody the shift operation by adjusting the quantization scale such as weight or kernel. For example, when the values on the X-axis of the activation function are used as inputs to the first and second sub-operation blocks 211 and 212, re-quantization of the first and second input ReQ blocks 510 and 540 may be performed with the shift operation. For example, when the values on the X-axis of the activation function are used with another layer, the first and second sub-operation blocks 211 and 212 may perform re-quantization by increasing the index bit number of the first and second sub-operation blocks 211 and 212 by 1-bit more than a minimum bit number that guarantees accuracy. Rescaling of the first and second output ReQ blocks 530 and 560 may also have the shift operation in substantially the same manner as in the first and second input ReQ blocks 510 and 540.

In an embodiment of the disclosure, when the function processing block 210 includes a block with the highest bit resolution such as the first sub-operation block 211 in the function processing block 210 to perform an operation, the function processing block 210 may use the output of the first sub-operation block 211 as an input to the second sub-operation block 212 with a bit resolution lower than the first sub-operation block 211. In this case, an approximation output value of the first sub-operation block 211 and the second sub-operation block 212 may have a relation of 2 to the power of 2. The function processing block 210 may replace the second input ReQ block 540 of the second sub-operation block 212 with the shift operation without using the multiply operation by using the output of the first sub-operation block 211 as an input to the second sub-operation block 212. For example, the function processing block 210 may restrict the scale of the output of the first sub-operation block 211 and the input and/or the output of the second sub-operation block 212. For example, the function processing block 210 may perform re-quantization on a scale of the input to the second sub-operation block 212 by repetitively using the first sub-operation block 211.

In an embodiment of the disclosure, an index, the output of the first or second input ReQ block 510 or 540 may be divided into an integer area corresponding to set digit places and a decimal area. The integer area may have an integer output value. The decimal area may have an output value from 0 to less than 1. The integer area may be used to find two neighboring points from the first LUT 520 or the second LUT 550 in approximating the input activation function. The decimal area may be used to measure a distance between two indexes in generating a final output value by interpolating outputs on the Y-axis of the neighboring two points found based on the integer area. For example, in performing the interpolation operation, the function processing block 210 may divide the distance on the X-axis of the points by 2^k, where k is an integer, to efficiently configure the function processing block 210. For example, in performing the interpolation operation, the function processing block 210 may use the shift operation instead of division, to efficiently configure the function processing block 210. For example, the function processing block 210 may perform an addition operation on bit precision higher than the final output value to maintain accuracy in combining the point values and interpolated values. For example, as a shift operation is required to generate a final output value after the point values are combined with the interpolated values, the function processing block 210 may handle the shift operation to generate the final output value as the shift operation in the output ReQ operation.

Figure 6:
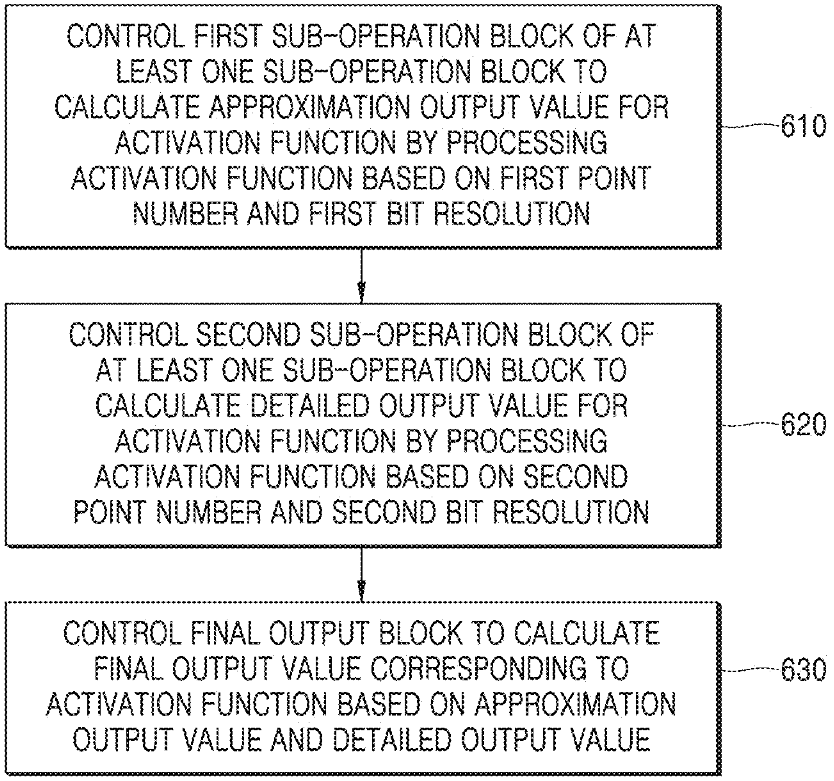
FIG. 6 illustrates a method of controlling an electronic device, according to an embodiment of the disclosure.

FIG. 6 is a flowchart illustrating a method of controlling the electronic device 100, according to an embodiment of the disclosure.

In operation 610, the accelerator 200 of the electronic device 100 may control the first sub-operation block 211 among the at least one sub-operation block included in the function processing block 210 to process the activation function based on the first point number and the first bit resolution. The accelerator 200 may control the first sub-operation block 211 included in the function processing block 210 to calculate an approximation output value for the activation function. For example, the first sub-operation block 211 may have a point number of 4 and a bit resolution of 24 bits. The first sub-operation block 211 may perform an interpolation operation corresponding to the input activation function. The first sub-operation block 211 may embody the input re-quantization procedure with the shift operation. The first sub-operation block 211 may process the output re-quantization procedure by combining with an interpolation operation on the LUT.

In operation 620, the accelerator 200 of the electronic device 100 may control the second sub-operation block 212 among the at least one sub-operation block included in the function processing block 210 to process the activation function based on the second point number and the second bit resolution. The accelerator 200 may control the second sub-operation block 212 included in the function processing block 210 to calculate a detailed output value for the activation function. For example, the second sub-operation block 212 may have a point number of 256 and a bit resolution of 8 bits. The second sub-operation block 212 may embody the input re-quantization procedure with the shift operation.

In operation 630, the accelerator 200 of the electronic device 100 may control the final output block 220 to calculate a final output value corresponding to the activation function based on the approximation output value and the detailed output value. The final output block 220 may select one of the approximation output value of the first sub-operation block 211, the detailed output value of the second sub-operation block 212 and a combined value of the approximation output value and the detailed output value as the final output value. The final output block 220 may determine a shift operation on the approximation output value in advance to correspond to an output scale of the second sub-operation block 212. Based on the shift operation on the approximation output value, output re-quantization of the first sub-operation block 211 may be determined.

Figure 7:
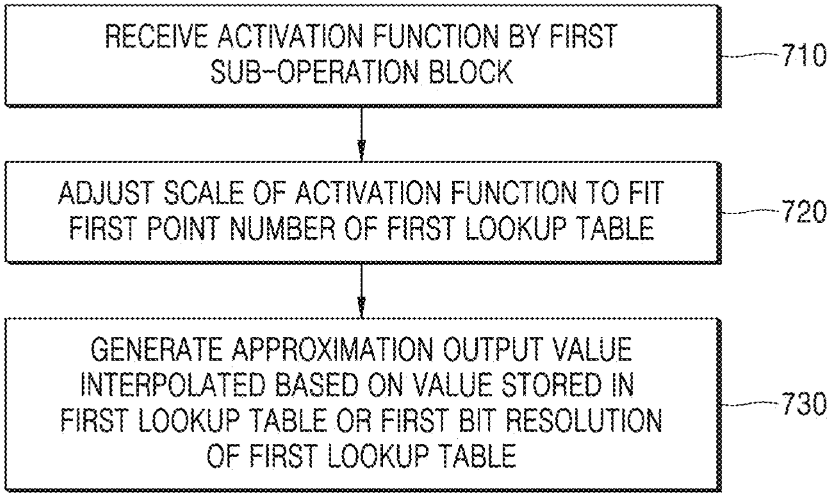
FIG. 7 illustrates a method by which a first sub-operation block of an electronic device generates an approximation output value, according to an embodiment of the disclosure.

FIG. 7 is a flowchart illustrating a method by which the first sub-operation block 211 of the electronic device 100 generates an approximation output value, according to an embodiment of the disclosure.

In operation 710, the first sub-operation block 211 of the electronic device 100 may receive an activation function. The first sub-operation block 211 may receive an input of a non-linear function such as a sigmoid function, a hyperbolic tangent (tan h) function, an ReLU function, an ELU function, or a GELU function as the activation function. The first sub-operation block 211 may receive and activate the activation function.

In operation 720, the first sub-operation block 211 of the electronic device 100 may adjust the scale of the activation function to fit the first point number of the first LUT. With the quantization of the activation function, at least one of the X-axis representing input values or the Y-axis representing output values may be saturated depending on the relative size of the scaled input value and the output value. Based on the saturation of the at least one axis, the first sub-operation block 211 may calculate maximum and minimum values of the scaled input value and the output value.

In operation 730, the first sub-operation block 211 of the electronic device 100 may generate an interpolated approximation output value based on a value stored in the first LUT or the first bit resolution of the first LUT. The first sub-operation block 211 may perform an interpolation operation to correspond to the first point number. The first sub-operation block 211 may obtain an approximation output value by performing the interpolation operation.

Figure 8:
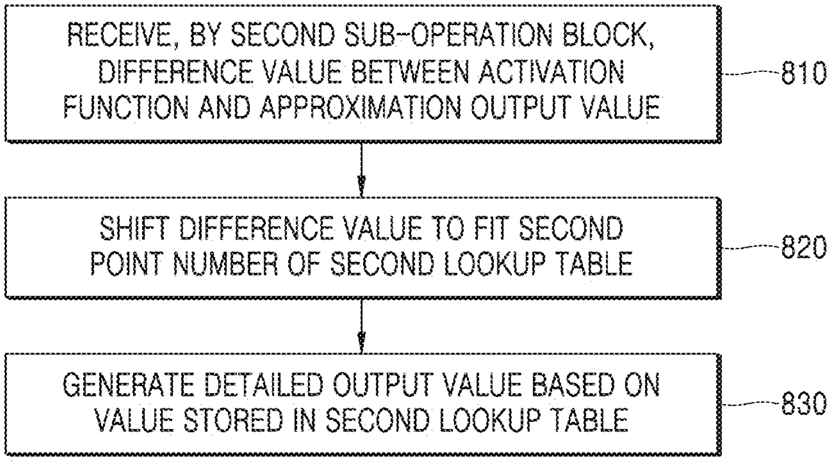
FIG. 8 illustrates a method by which a second sub-operation block of an electronic device generates a detailed output value, according to an embodiment of the disclosure.

FIG. 8 is a flowchart illustrating a method by which the second sub-operation block 212 of the electronic device 100 generates a detailed output value, according to an embodiment of the disclosure.

In operation 810, the second sub-operation block 212 of the electronic device 100 may receive a difference value between the activation function and the approximation output value. For example, when receiving the activation function, the second sub-operation block 212 may receive and store a difference value between a result of the interpolation operation of the first sub-operation block 211 and a value of the real activation function.

In operation 820, the second sub-operation block 212 of the electronic device 100 may shift the difference value to fit the second point number of the second LUT. The second sub-operation block 212 may shift the difference value to fit the second point number to process the difference value by using the second LUT.

In operation 830, the second sub-operation block 212 of the electronic device 100 may generate a detailed output value based on a value stored in the second LUT. The second sub-operation block 212 may determine an output value corresponding to the difference value by using the second LUT. The second LUT may determine an output value corresponding to the difference value as a detailed output value.

Figure 9:
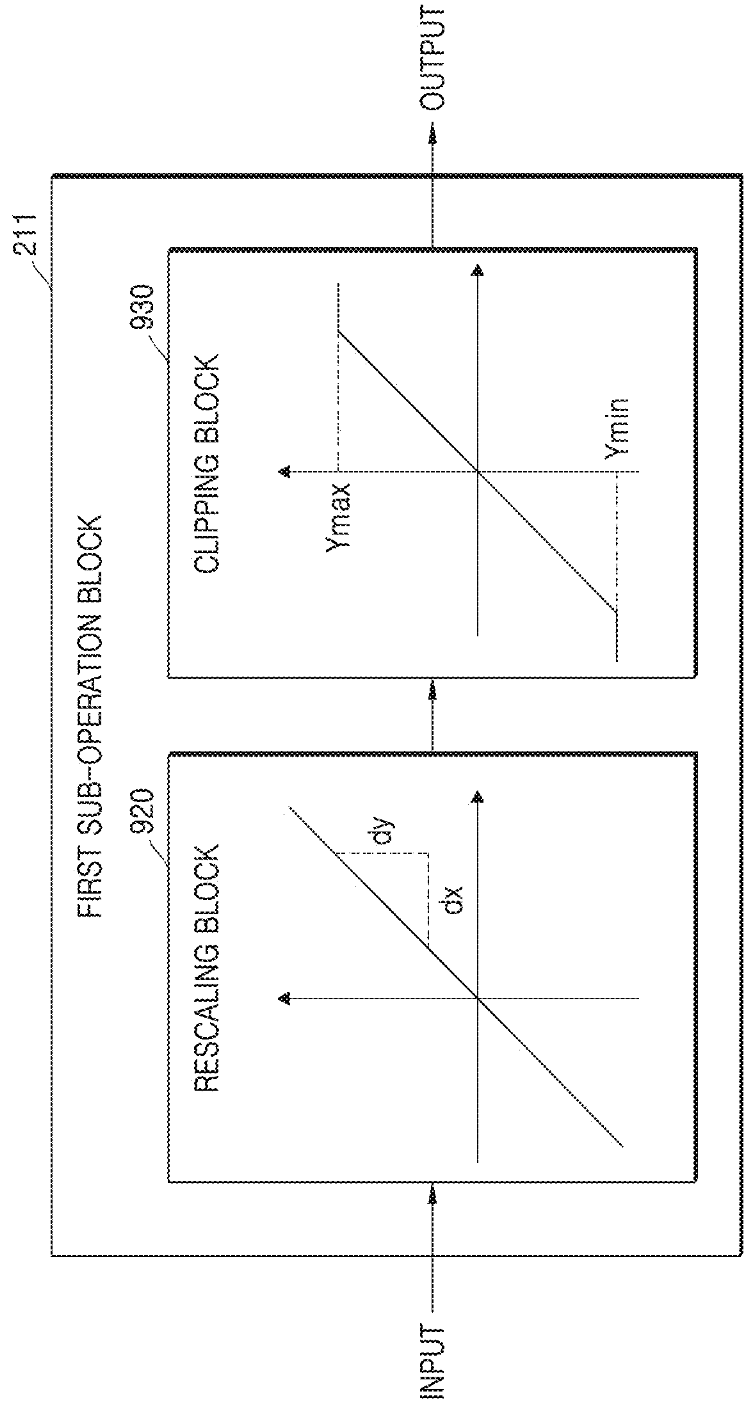
FIG. 9 illustrates a procedure in which a first sub-operation block of an electronic device generates an output by processing an input, according to an embodiment of the disclosure.

FIG. 9 illustrates a procedure in which the first sub-operation block 211 of the electronic device 100 generates an output by processing an input, according to an embodiment of the disclosure. The first sub-operation block 211 may include a rescaling block 920 and a clipping block 930.

In an embodiment of the disclosure, an input may be processed by the first sub-operation block 211. For example, the input may be an activation function of the first sub-operation block 211.

In an embodiment of the disclosure, the rescaling block 920 may receive the input. The rescaling block 920 may adjust the size unit of the input to a size unit that may be processed by the first sub-operation block 211. For example, when the point number of the first sub-operation block 211 is 2, the rescaling block 920 may perform scaling to adjust the size unit of the input based on a distance between the two points. The rescaling block 920 may record slope information of the input. For example, the rescaling block 920 may obtain the slope information of the input based on a variation dy on the Y-axis for a variation dx on the X-axis of the input.

In an embodiment of the disclosure, the clipping block 930 may receive an input scaled by the rescaling block 920. The clipping block 930 may record a maximum value Ymax and a minimum value Ymin of an output 940 for the scaled input. When the output 940 for the scaled input is in between the maximum value Ymax and the minimum value Ymin, the clipping block 930 may maintain the value of the output 940. The clipping block 930 may determine values of the output 940 equal to or larger than the maximum value Ymax for the scaled input to be the maximum value Ymax. The clipping block 930 may determine output values equal to or smaller than the minimum value Ymin for the scaled input to be the minimum value Ymin. For example, when the output is proportional to the input, the clipping block 930 may process a section above the maximum value Ymax for the scaled input to have the constant maximum value Ymax and a section below the minimum value Ymin to have the constant minimum value Ymin. As the scaled input corresponds to a linear function, the clipping block 930 may generate an output based on the slope information and the maximum value Ymax and the minimum value Ymin of the output 40.

Figure 10:
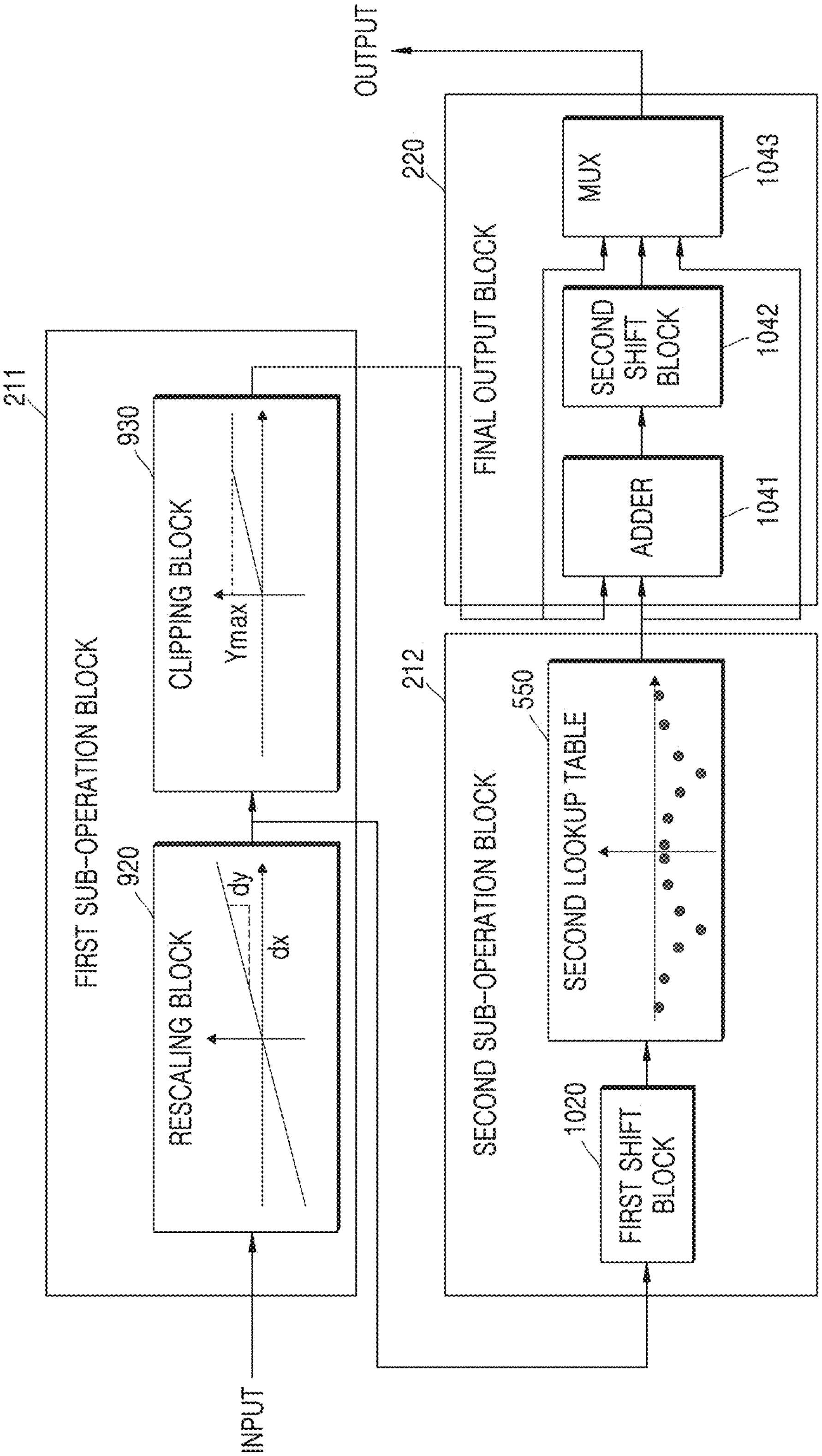
FIG. 10 illustrates a procedure in which a function processing block of an electronic device generates an output by processing an input, according to an embodiment of the disclosure.

FIG. 10 illustrates a procedure in which the function processing block 210 of the electronic device 100 generates an output by processing an input, according to an embodiment of the disclosure.

In an embodiment of the disclosure, the first sub-operation block 211 may receive and process an input. The first sub-operation block 211 may process the input by using the rescaling block 920 and the clipping block 930. The first sub-operation block 211 may generate an approximation output value by processing the input.

In an embodiment of the disclosure, the second sub-operation block 212 may receive the approximation output value from the first sub-operation block 211. The second sub-operation block 212 may use the approximation output value as an input. The second sub-operation block 212 may include a first shift block 1020 and the second LUT 550.

In an embodiment of the disclosure, the first shift block 1020 may shift the approximation output value to be processed by the second sub-operation block 212. For example, the first shift block 1020 may shift the approximation output value to correspond to the second point number of the second LUT 550 of the second sub-operation block 212. The first shift block 1020 may send the shifted approximation output value to the second LUT 550.

In an embodiment of the disclosure, the second LUT 550 may process the shifted approximation output value. The second LUT 550 may generate a detailed output value for the input 1010. The second LUT 550 may send the detailed output value to the final output block 220.

In an embodiment of the disclosure, the final output block 220 may output a result of selecting or combining the at least one output value as an output. The final output block 220 may calculate an output corresponding to the activation function based on the approximation output value and the detailed output value. The final output block 220 may include an adder 1041, a second shift block 1042 and a MUX 1043. The adder 1041 may combine an output value of the first sub-operation block 211 and an output value of the second sub-operation block 212. The second shift block 1042 may shift the combined value of the output value of the first sub-operation block 211 and the output value of the second sub-operation block 212. The MUX 1043 may receive a total of three kinds of values, the output value of the first sub-operation block 211, the output value of the second sub-operation block 212, and the combined value of the output value of the first sub-operation block 211 and the output value of the second sub-operation block 212. The MUX 1043 may bypass the output of the first sub-operation block 211 or the output of the second sub-operation block 212 according to a given setting, or generate a final output by selecting a value obtained by shifting the combined value of the output value of the first sub-operation block 211 and the output value of the second sub-operation block 212.

Figure 11:
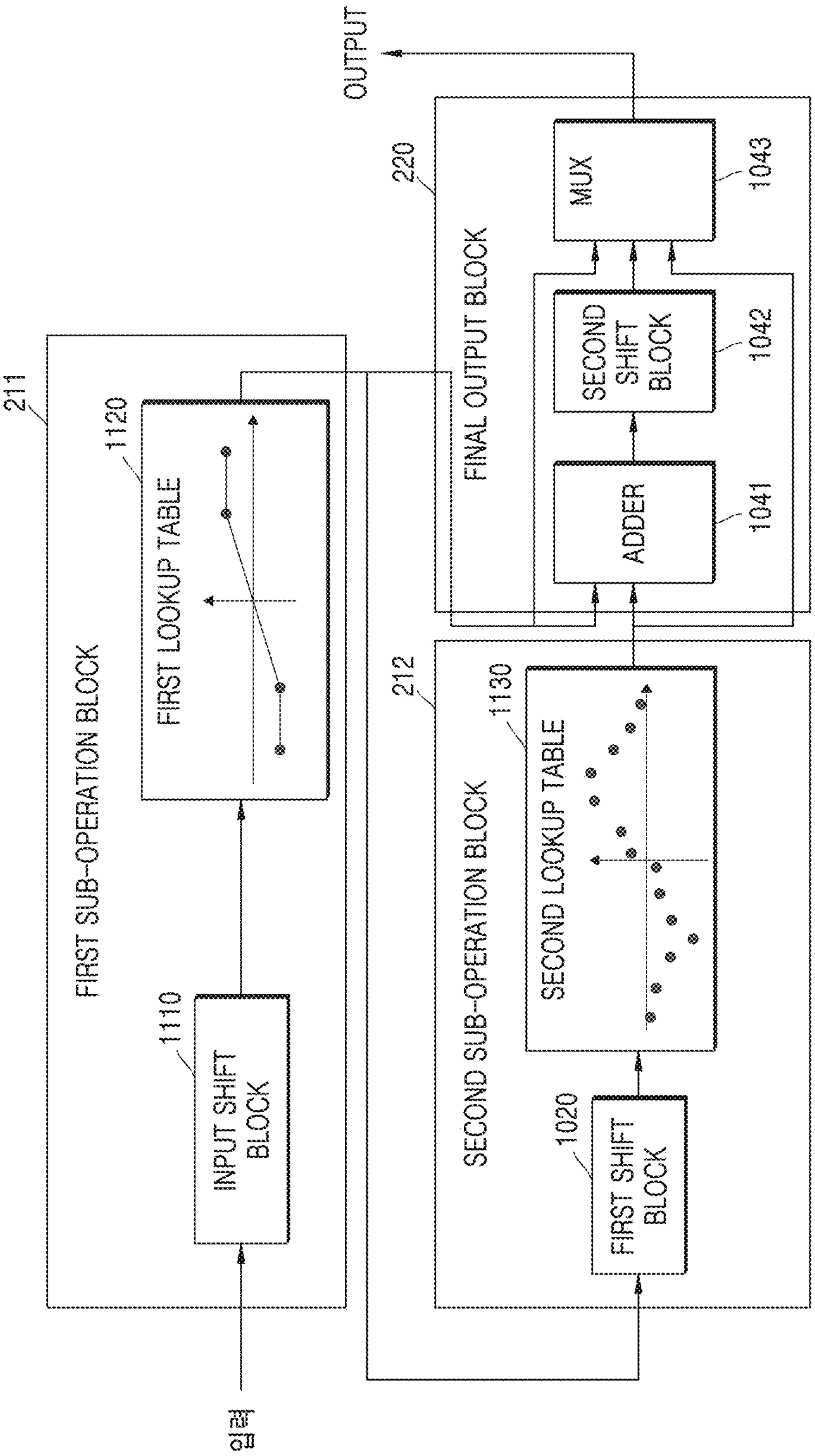
FIG. 11 illustrates a procedure in which a function processing block of an electronic device generates an output by processing an input, according to an embodiment of the disclosure.

FIG. 11 illustrates a procedure in which the function processing block 210 of the electronic device 100 generates an output by processing an input, according to an embodiment of the disclosure.

In an embodiment of the disclosure, the accelerator 200 of the electronic device 100 may include the function processing block 210 including the two sub-operation blocks (the first sub-operation block 211 and the second sub-operation block 212) and the one final output block 220. A result of shifting the output of the first sub-operation block 212 may be used as an input to the second sub-operation block 211 of the function processing block 210. The output of the second sub-operation block 212 and the output of the first sub-operation block 211 may have a relation of 2 to the power of 2. The input of the second sub-operation block 212 and the output of the second sub-operation block 212 may have a relation of 2 to the power of 2. When the function processing block 210 includes the first and second sub-operation blocks 211 and 212, an amount of required information may be reduced due to the primary approximation in the first sub-operation block 211 as compared to an occasion when only one sub-operation block is included. Accordingly, in the case that the function processing block 210 includes the first and second sub-operation blocks 211 and 212, accuracy of the accelerator 200 may increase. Especially, an accuracy required by the accelerator 200 may be obtained by adjusting the bit resolution of the second sub-operation block 212.

In an embodiment of the disclosure, the first sub-operation block 211 may have the point number of four. For example, the first sub-operation block 211 may have a bit resolution of 24 bits. The first sub-operation block 211 may perform an interpolation operation to fit the input. The input ReQ block of the first sub-operation block 211 may be implemented with a shift operation. The output ReQ of the first sub-operation block 211 may be processed by an interpolation operation and combination for the LUT (e.g., the first LUT 520).

In an embodiment of the disclosure, the second sub-operation block 212 may have the point number of 256. For example, the second sub-operation block 212 may have a bit resolution of 8 bits. The second sub-operation block 212 may use the output of the first sub-operation block 211 as an input. The input ReQ block of the second sub-operation block 212 may be implemented with a shift operation. The second sub-operation block 212 may process a result of the approximation in the first sub-operation block 211 more accurately, so may not perform the interpolation operation. The second sub-operation block 212 may not perform output re-quantization to prevent duplication with the output re-quantization procedure of the first sub-operation block 211.

In an embodiment of the disclosure, the final output block 220 may determine a final output by selecting one of a total 3 output values: the output value of the first sub-operation block 211, the output value of the second sub-operation block 212, and the combined value of the output value of the first sub-operation block 211 and the output value of the second sub-operation block 212. The shift operation on the output of the adder 1041 of the final output block 220 may be determined to fit the output scale of the second sub-operation block 212. The output re-quantization of the first sub-operation block 211 may be configured by taking into account the output scale of the second sub-operation block 211.

Figure 12:
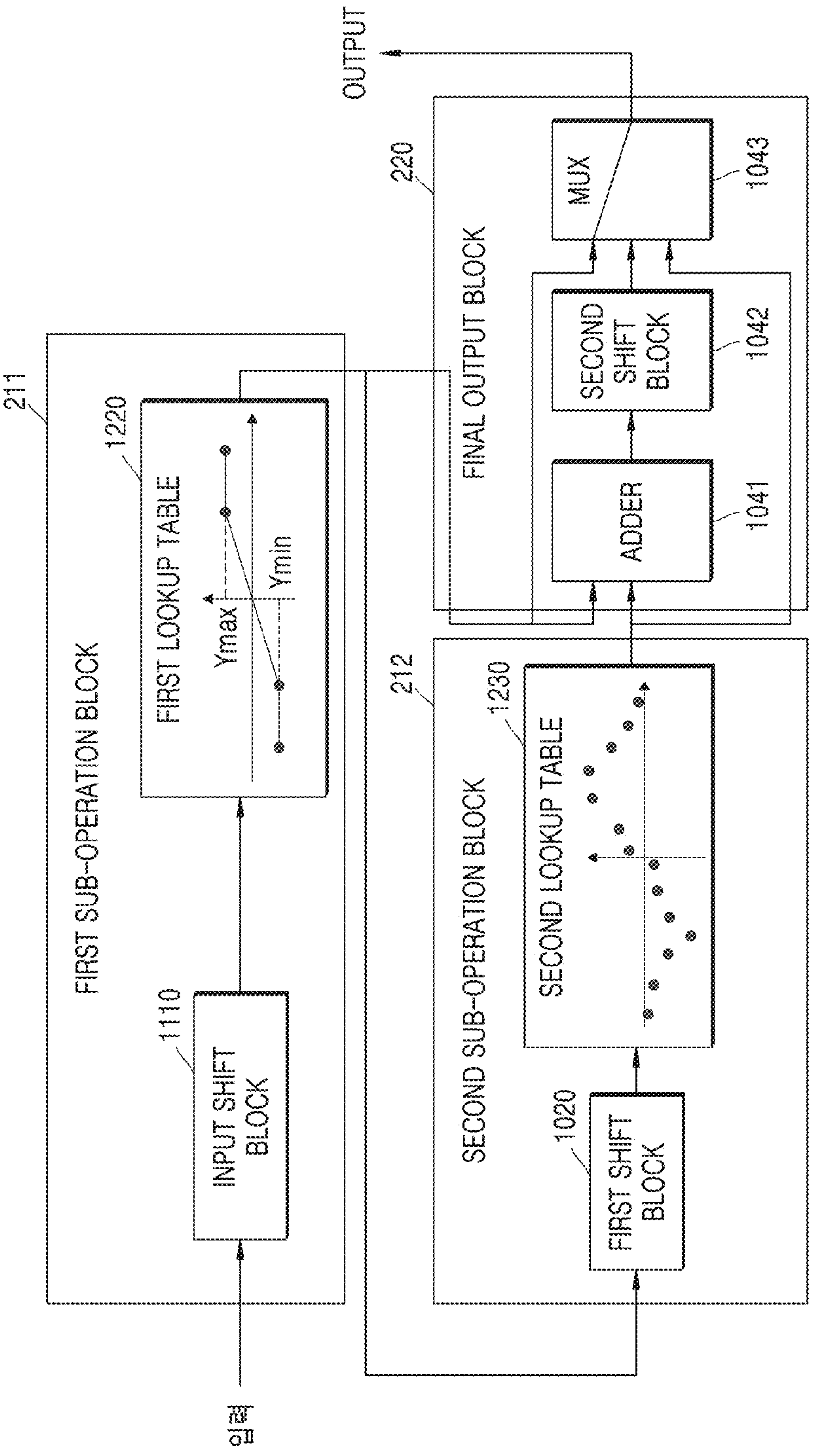
FIG. 12 illustrates a symmetric quantization procedure of a function processing block of an electronic device, according to an embodiment of the disclosure.

FIG. 12 illustrates a symmetric quantization procedure of the function processing block 210 of the electronic device 100, according to an embodiment of the disclosure.

In an embodiment of the disclosure, assuming an input and an output as X and Y, respectively, the function processing block 210 may perform rescaling of symmetric quantization as follows:

$$Y = X * Sxy,\ Sxy = ScaleX/ScaleY$$

where Sxy may be a scaling ratio. The function processing block 210 may adjust the value of Sxy in order to use the output value of the first sub-operation block 211 as an input value of the second sub-operation block 212.

In FIG. 12, symmetric quantization is assumed. In other embodiments, asymmetric quantization may be substantially equally processed. Assuming an input and an output as X and Y, respectively, the function processing block 210 may perform rescaling of asymmetric quantization by adjusting zero point as described below. The zero point may refer to a point at which the activation function corresponding to the input has symmetry.

$$Y = (X - ZPx) * Sxy + ZPy,\ Sxy = ScaleX/ScaleY$$

where (ZPx, ZPy) may be coordinates of the zero point. When an input value to which an X-axis coordinate value of the zero point is added and an output value before a Y-axis coordinate value is added thereto are used, the function processing block 210 may perform rescaling of asymmetric quantization in substantially the same manner as rescaling of symmetric quantization. For example, the function processing block 210 may perform rescaling of asymmetric quantization in substantially the same manner as rescaling of symmetric quantization by adding a prologue task or an epilogue task that reflects the zero point.

In an embodiment of the disclosure, the first sub-operation block 211 may be activated. The first sub-operation block 211 may receive an input. An input shift block 1110 of the first sub-operation block 211 may receive the input and shift the input according to a scaling ratio. The input shift block 1110 may send the shifted input to a first LUT 1220.

In an embodiment of the disclosure, the first sub-operation block 211 may saturate at least one of the axes corresponding to the input and the output based on the scaling ratio. In the case of the saturated axis, a maximum value and a minimum value may be reached within a rescaled range. For example, when the Y-axis corresponding to the output is saturated, the Y-axis may have a maximum value Ymax and a minimum value Ymin within the rescaled range. After the function value reaches the maximum value or the minimum value on the saturated axis, the first sub-operation block 211 may clip result values equal to or higher than the maximum value or equal to or lower than the minimum value. The clipped result values may be maintained as the constant maximum value or the constant minimum value. The first sub-operation block 211 may calculate values of (Xmin, Ymin) or (Xmax, Ymax) based on the clipped result values.

In an embodiment of the disclosure, the first sub-operation block 211 may calculate a result value based on the first bit resolution and the first point number that the first LUT 1220 has. Each point in the first LUT 1220 may have a bit resolution of 24 bits. The first LUT 1220 may have four points. Locations of the four points included in the first LUT 1220 may be set to increase accuracy in result values of the first sub-operation block 211. For example, the four points of the first LUT 1220 may be set to a first point (3Xmin, Ymin), a second point (Xmin, Ymin), a third point (Xmax, Ymax) and a fourth point (3Xmax, Ymax).

In an embodiment of the disclosure, the first sub-operation block 211 may perform an interpolation operation according to the four points and the bit resolution of 24 bits that the first LUT 1220 has. For example, the first sub-operation block 211 may not consider but discard the first point (3Xmin, Ymin) that has the smallest X-axis value during the interpolation operation procedure. For example, when performing the interpolation operation on the fourth point (3Xmax, Ymax) having the largest X-axis value, the first sub-operation block 211 may make calculation with the same Y value as in performing the interpolation operation on the third point (Xmax, Ymax). The first sub-operation block 211 may send a result value of the interpolation operation to the final output block 220.

In an embodiment of the disclosure, the second sub-operation block 212 may not perform any operation. The re-quantization procedure may be performed only by the first sub-operation block 211. The second sub-operation block 212 may remain inactive without performing an unnecessary operation.

In an embodiment of the disclosure, the final output block 220 may choose the result value calculated by the first sub-operation block 211 as a final output. The MUX 1043 of the final output block 220 may choose a result value of the interpolation operation received from the first LUT 1220 of the first sub-operation block 211 as a final output.

In an embodiment of the disclosure, the function processing block 210 may perform an operation of an ReLU function by performing a re-quantization operation process based on the symmetric quantization method. The function processing block 210 may handle the operation of the ReLU function with a case of setting (Xmin, Ymin) to (0, 0). The function processing block 210 may set (Xmin, Ymin) to (0, 0) to perform the operation of the ReLU. The function processing block 210 may adjust the value of (Xmin, Ymin). In the case of adjusting the value of (Xmin, Ymin), the function processing block 210 may perform the operation of the ReLU function and the re-quantization operation at the same time. The function processing block 210 may use the result value calculated by the first sub-operation block 211 to output a result value of the operation of the ReLU function. The function processing block 210 may keep the second sub-operation block 212 in an inactive state during the operation of the ReLU function.

Figure 13A:
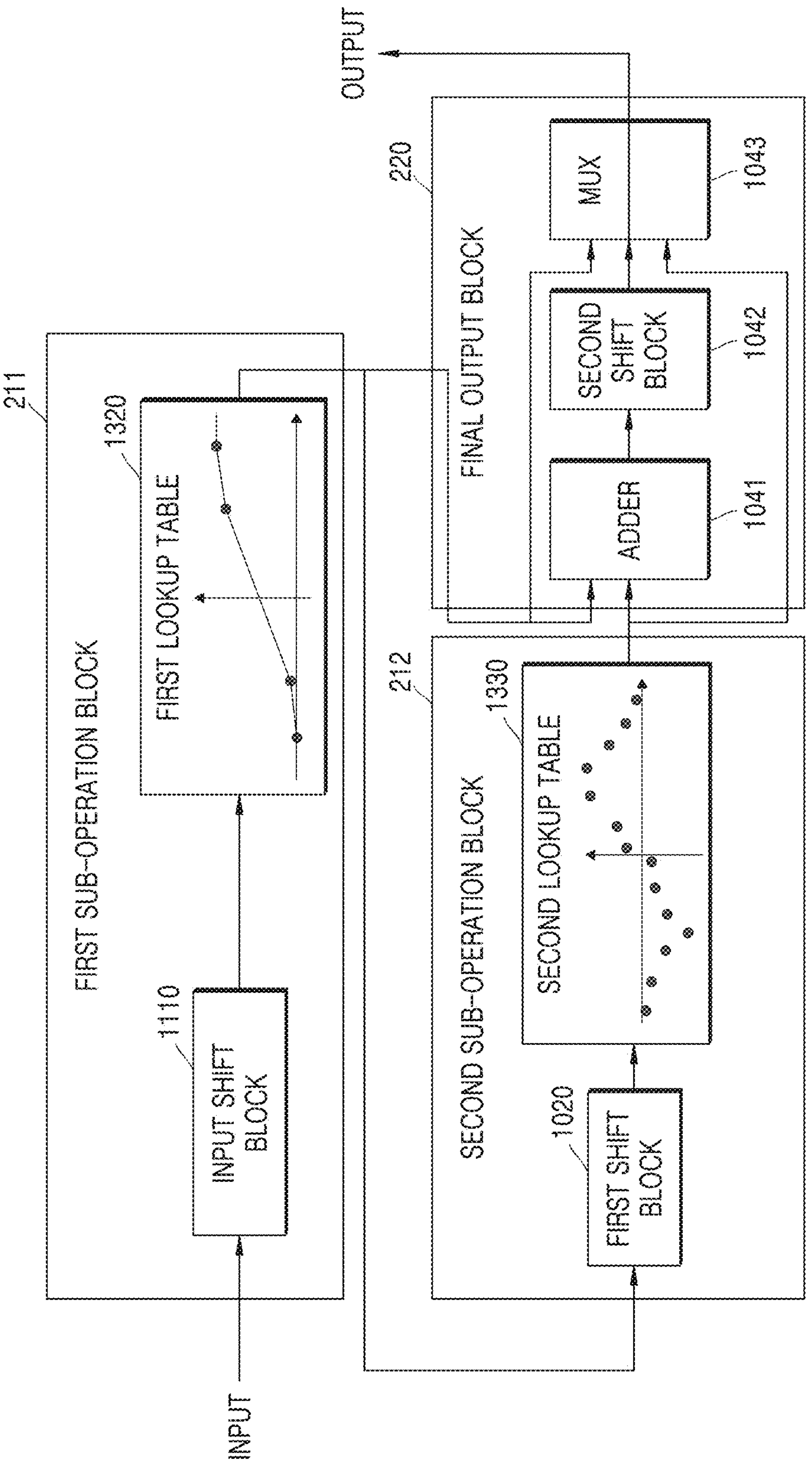
FIG. 13A illustrates a procedure for processing a sigmoid function input to a function processing block of an electronic device, according to an embodiment of the disclosure.

FIG. 13A illustrates a procedure for processing a Sigmoid function input to the function processing block 210 of the electronic device 100, according to an embodiment of the disclosure.

In an embodiment of the disclosure, the first sub-operation block 211 may receive the Sigmoid function as an input. The first sub-operation block 211 may use the input shift block 1110 to shift the Sigmoid function to correspond to the scale of a first LUT 1320. The first sub-operation block 211 may use the first LUT 1320 to linearly process the Sigmoid function. The first sub-operation block 211 may send a difference value between the real Sigmoid function corresponding to the input and an approximation output value linearly processed based on the first LUT 1320 to the second sub-operation block 212.

In an embodiment of the disclosure, the first LUT 1320 of the first sub-operation block 211 may have the point number of four. For example, the first LUT 1320 may have the first point, the second point, the third point and the fourth point from left on the X-axis.

In an embodiment of the disclosure, the four points that the first LUT has may be calculated by taking into account quantization of the Sigmoid function. For example, the first point and the fourth point at either end on the X-axis may have values approximate to 0 and 1, respectively, which are values de-quantized with consideration for a range of the X values. For example, the first point and the fourth point may have fixed values of 0 and 1, respectively.

In an embodiment of the disclosure, the two points in the middle of the X-axis, the second point and the third point may be determined by taking into account accuracy of the second sub-operation block 212. For example, the second point and the third point may have values to minimize an error of a detailed output value output by the second sub-operation block 212 when the second sub-operation block 212 receives a difference value between the real function and the approximation output value from the first LUT 1320. For example, the second point and the third point may have values of when the real function value corresponds to a value obtained by linearizing the Sigmoid function.

In an embodiment of the disclosure, the second sub-operation block 212 may store a difference value between an approximation output value resulting from interpolation in the first sub-operation block 211 and the real Sigmoid function value. The second sub-operation block 212 may output a detailed output value by processing the difference value. The second sub-operation block 212 may store a value with a precision having a certain number of bits larger than the number of bits of the detailed output value. Hence, the second sub-operation block 212 may output the detailed output value at a designated accuracy required by the function processing block 210.

In an embodiment of the disclosure, the final output block 220 may receive the approximation output value output by the first sub-operation block 211 and the detailed output value output by the second sub-operation block 212. The adder 1041 of the final output block 220 may generate a combined value of the approximation output value and the detailed output value. The second shift block 1042 of the final output block 220 may shift the combined value of the approximation output value and the detailed output value as many times as a set number of bits to fit the value of a final output 1350. The MUX 1043 of the final output block 220 may receive the approximation output value, the detailed output value, and the combined value of the approximation output value and the detailed output value. The MUX 1043 may choose the combined value of the approximation output value and the detailed output value. Accordingly, the final output block 220 may output the combined value of the approximation output value and the detailed output value as a final output value.

In an embodiment of the disclosure, the function processing block 210 may process a tan h function in substantially the same manner as for the Sigmoid function as well. The Sigmoid function and tan h function may have minimum and maximum values on the Y-axis and may be converged with respect to the Y-axis. Hence, the Sigmoid function and tan h function may be processed by using the second sub-operation block 212. However, the function processing block 210 may first use the first sub-operation block 211 to generate an approximation output value through linearization, and then use the second sub-operation block 212 to process a difference value between the real function and the approximation output value to generate a detailed output value. Accordingly, the function processing block 210 may obtain a more accurate final output value with the same number of bits.

Figure 13B:
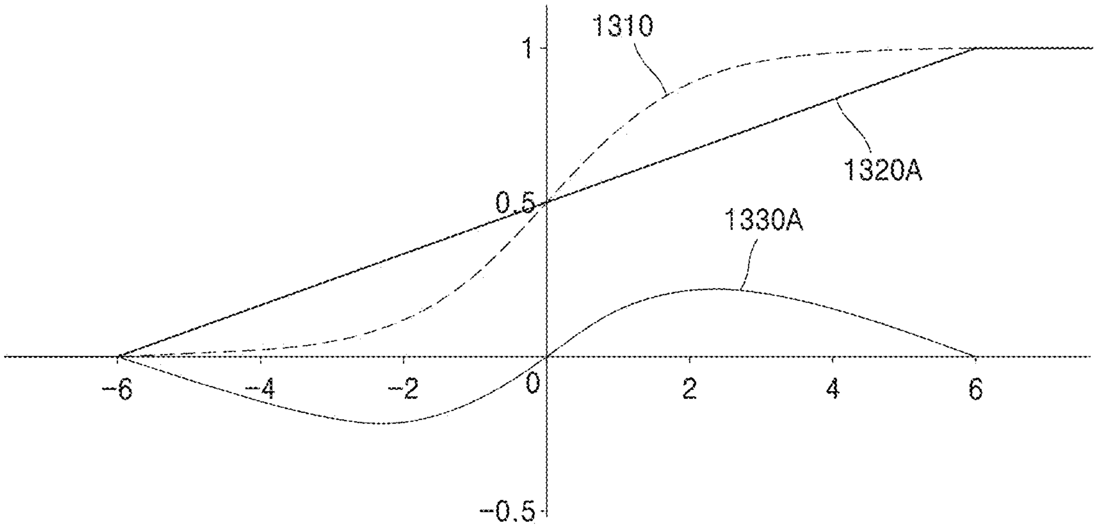
FIG. 13B illustrates inputs and outputs when a sigmoid function is input to a function processing block of an electronic device, according to an embodiment of the disclosure.

FIG. 13B is a graph representing inputs and outputs when a Sigmoid function is input to the function processing block 210 of the electronic device 100, according to an embodiment of the disclosure. In FIG. 13B, represented are a real Sigmoid function 1310 corresponding to an input, an approximation output value 1320A corresponding to an output of the first sub-operation block 211 (or an output of the first LUT 1320), and a detailed output value 1330A corresponding to an output of the second sub-operation block 212 (or an output of the second LUT 1330).

In an embodiment of the disclosure, the function processing block 210 may use the first and second sub-operation blocks 211 and 212 to reduce an output range required to represent a result of processing the Sigmoid function. In a case that the second sub-operation block 212 alone processes the real Sigmoid function 1310 corresponding to the input to obtain a result, an output range required to represent the processed result may be 0 to 1. In an embodiment of the disclosure, the function processing block 210 of the electronic device 100 may use the detailed output value 1330A corresponding to the output of the second sub-operation block 212. Hence, the function processing block 210 may reduce the output range required to represent the result of processing the Sigmoid function to a range from about −0.217 to about 0.217, i.e., by about 55%. Accordingly, the function processing block 210 may obtain a more accurate result of processing the Sigmoid function. Along with or separately from the above effect, the function processing block 210 may maintain the same accuracy but may reduce the point number and/or the bit resolution required by the second sub-operation block 212 to process the Sigmoid function.

Figure 14A:
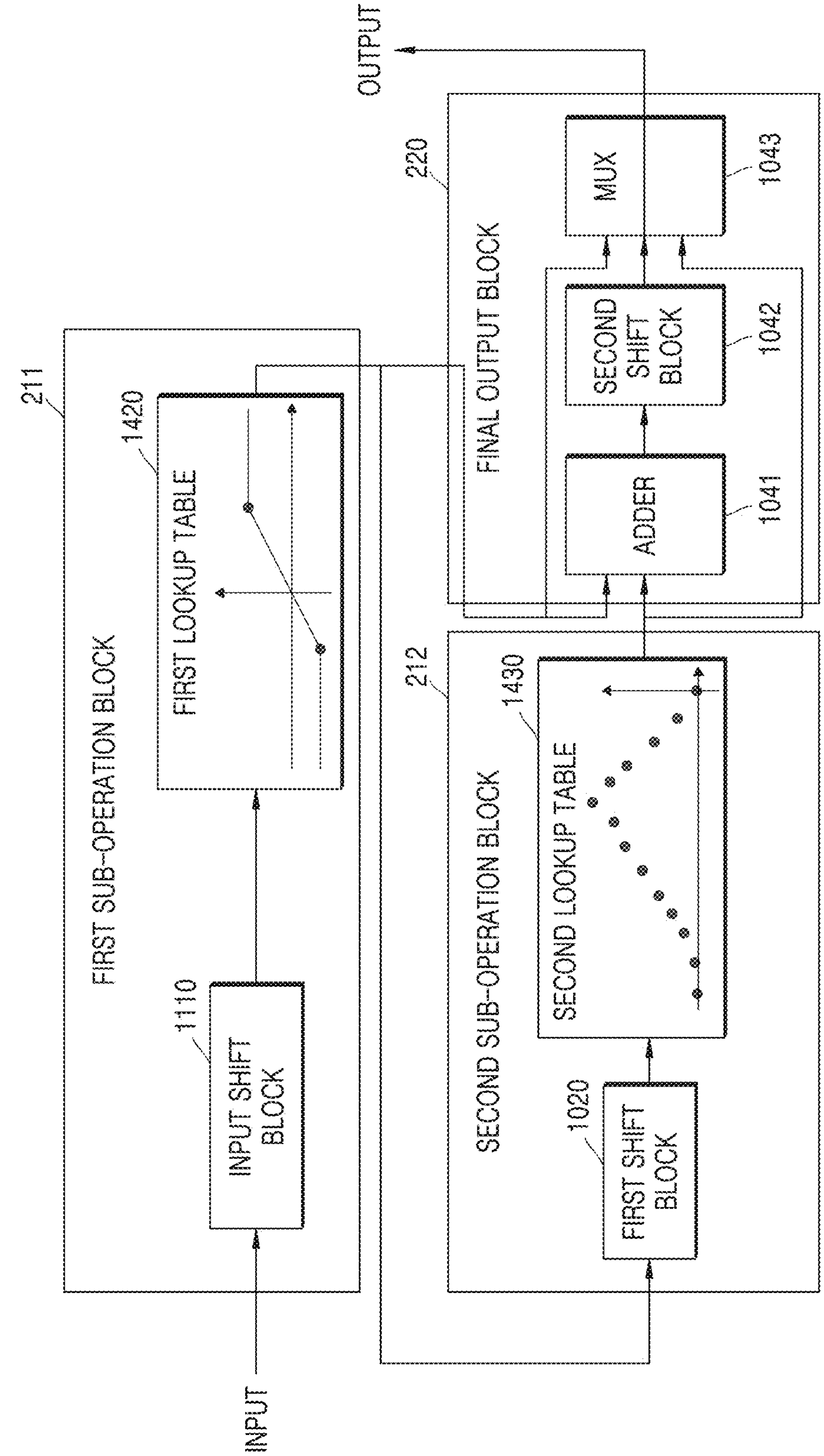
FIG. 14A illustrates a procedure for processing an exponential linear unit (ELU) function input to a function processing block of an electronic device, according to an embodiment of the disclosure.

FIG. 14A illustrates a procedure for processing an ELU function input to the function processing block 210 of the electronic device 100, according to an embodiment of the disclosure.

In an embodiment of the disclosure, the first sub-operation block 211 may receive the ELU function as an input. The first sub-operation block 211 may use the input shift block 1110 to shift the ELU function to correspond to the scale of the first LUT 1320. The first sub-operation block 211 may use the first LUT 1320 to linearly process the ELU function. The first sub-operation block 211 may send a difference value between the real ELU function corresponding to the input and an approximation output value linearly processed based on the first LUT 1320 to the second sub-operation block 212.

In an embodiment of the disclosure, the first sub-operation block 211 may set locations of two of four points included in the first LUT 1320. For example, the first LUT 1320 set locations in the coordinate system of the first point in a negative section on the X-axis and the second point in a positive section on the X-axis.

In an embodiment of the disclosure, the first sub-operation block 211 may set two of the four points included in the first LUT 1320 similarly to the rescaling operation. For example, the first sub-operation block 211 may set the first point in the first LUT 1320 to (−1, −1). The setting of the first point in the first LUT 1320 to (−1, −1) may be to consider a real value before the first sub-operation block 211 performs a quantization operation. The first sub-operation block 211 may set the real coordinates of the first point to a quantized value corresponding to (−1, −1). For example, the first sub-operation block 211 may set the second point in the first LUT 1320 to (Xmax, Ymax).

In an embodiment of the disclosure, the first sub-operation block 211 may set locations of the four points included in the first LUT 1320. The first sub-operation block 211 may set the locations of the four points included in the first LUT 1320 in the coordinate system based on a relation between the scale of the first LUT 1320 and the scale of the second sub-operation block 212. The setting of the locations of the four points in the first LUT 1320 in the coordinate system may reduce an amount of information to be processed by the second sub-operation block 212. Hence, the setting of the four points in the first LUT 1320 in the coordinate system may further enhance accuracy in result of processing of the second sub-operation block 212.

In an embodiment of the disclosure, the second sub-operation block 212 may store a difference value between an approximation output value resulting from interpolation in the first sub-operation block 211 and the real ELU function value. The second sub-operation block 212 may output a detailed output value by processing the difference value. The second sub-operation block 212 may store a value with a precision having a certain number of bits larger than the number of bits of the detailed output value. Hence, the second sub-operation block 212 may output the detailed output value at a designated accuracy required by the function processing block 210.

In an embodiment of the disclosure, the final output block 220 may receive the approximation output value output by the first sub-operation block 211 and the detailed output value output by the second sub-operation block 212. The adder 1041 of the final output block 220 may generate a combined value of the approximation output value and the detailed output value. The second shift block 1042 of the final output block 220 may shift the combined value of the approximation output value and the detailed output value as many times as a set number of bits to fit the final output value. The MUX 1043 of the final output block 220 may receive the approximation output value, the detailed output value, and the combined value of the approximation output value and the detailed output value. The MUX 1043 may choose the combined value of the approximation output value and the detailed output value. Accordingly, the final output block 220 may output the combined value of the approximation output value and the detailed output value as a value of the final output 1450.

In an embodiment of the disclosure, the function processing block 210 may process the ELU function by using the first and second sub-operation blocks 211 and 212. The ELU function is a function that has divergent output values in the positive section on the X-axis unlike the Sigmoid function and the tan h function. Hence, when the function processing block 210 processes the ELU function only with the second sub-operation block 212, accuracy in result values output from the function processing block 210 may be reduced to a critical value or less even when the saturation from the quantization is taken into account. Accordingly, the function processing block 210 may generate an approximation output value by primary approximation and linearization by performing a linear interpolation operation with the first sub-operation block 211 in the positive section of the X-axis. When the function processing block 210 generates the approximation output value, an amount of information stored in the second sub-operation block may be reduced. The function processing block 210 may generate a detailed output value by processing a difference value between the real ELU function and the approximation output value with the second sub-operation block 212. Accordingly, the function processing block 210 may obtain a final output value with an accuracy approximate to an actual operation.

Figure 14B:
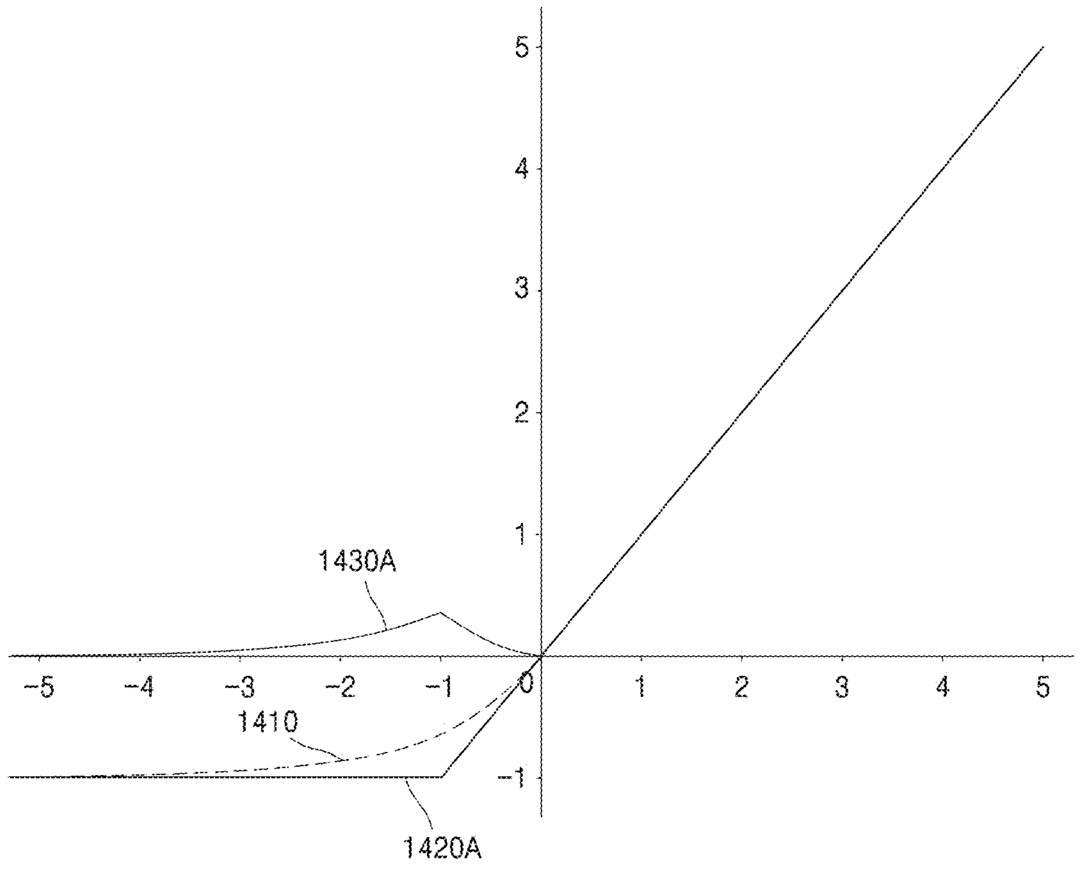
FIG. 14B illustrates inputs and outputs when an ELU function is input to a function processing block of an electronic device, according to an embodiment of the disclosure.

FIG. 14B is a graph representing inputs and outputs when an ELU function is input to the function processing block 210 of the electronic device 100, according to an embodiment of the disclosure. In FIG. 14B, represented are a real ELU function 1410 corresponding to an input, an approximation output value 1420A corresponding to an output of the first sub-operation block 211 (or an output of the first LUT 1420), and a detailed output value 1430A corresponding to an output of the second sub-operation block 212 (or an output of the second LUT 1430).

In an embodiment of the disclosure, the function processing block 210 may use the first and second sub-operation blocks 211 and 212 to reduce an output range required to represent a result of processing the ELU function. In a case that the second sub-operation block 212 alone processes the real ELU function 1410 corresponding to the input to obtain a result, an output range required to represent the processed result may correspond to the entire section having at least −1, which has a form that has a divergent maximum value without an upper limit. In an embodiment of the disclosure, the function processing block 210 of the electronic device 100 may use the detailed output value 1330A corresponding to the output of the second sub-operation block 212. Hence, the function processing block 210 may restrict a range of information to be stored by the second sub-operation block 212 to represent the result of processing the ELU function to within a certain range. In the case of restricting the range of information to be stored by the second sub-operation block 212 to within the certain range, a scale of a function processed by the second sub-operation block 212 may be reduced. Accordingly, the function processing block 210 may obtain a more accurate result of processing the ELU function.

Figure 15A:
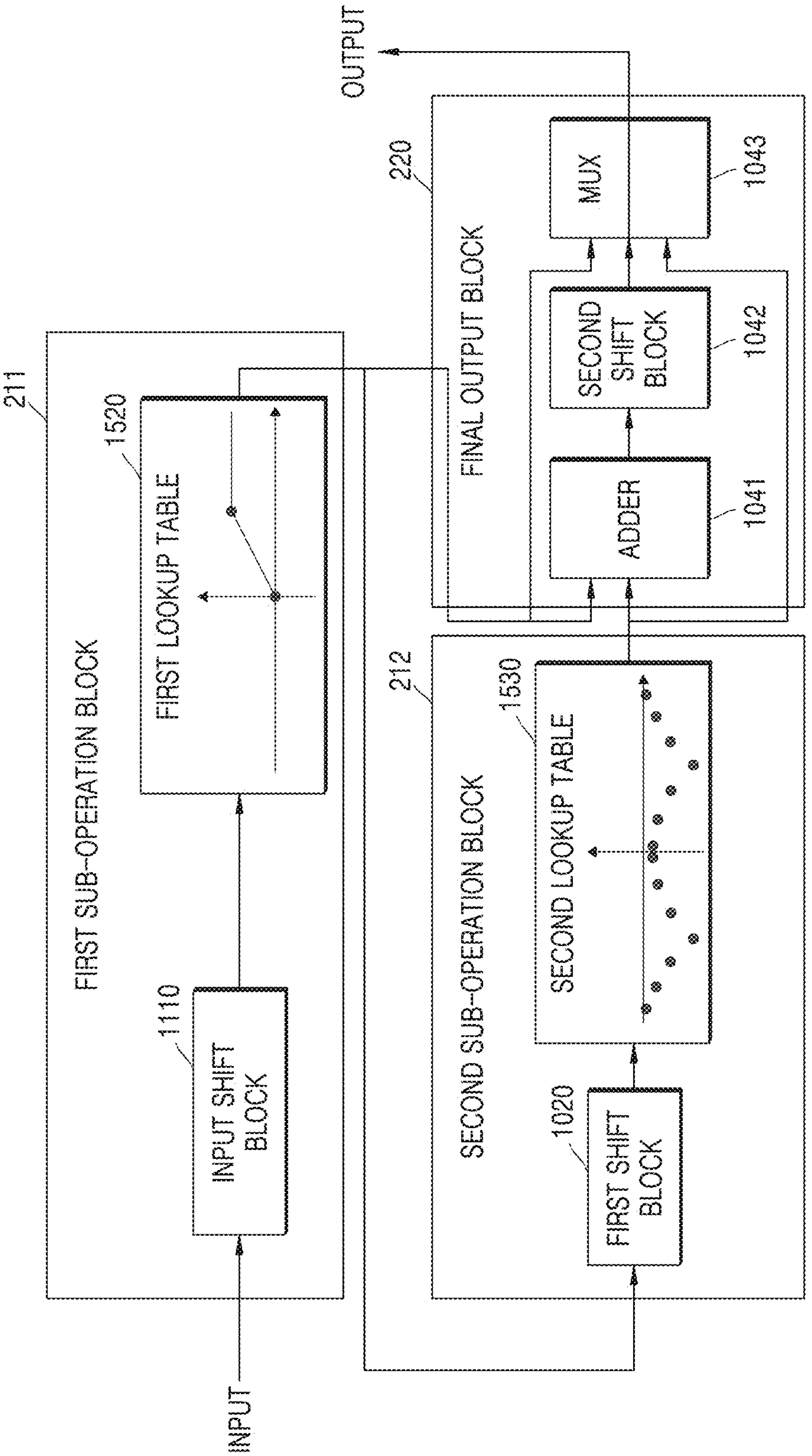
FIG. 15A illustrates a procedure for processing a Gaussian error linear unit (GELU) function input to a function processing block of an electronic device, according to an embodiment of the disclosure.

FIG. 15A illustrates a procedure for processing a GELU function input to the function processing block 210 of the electronic device 100, according to an embodiment of the disclosure.

In an embodiment of the disclosure, the first sub-operation block 211 may receive the GELU function as an input. The first sub-operation block 211 may use the input shift block 1110 to shift the GELU function to correspond to the scale of the first LUT 1420. The first sub-operation block 211 may use the first LUT 1420 to linearly process the GELU function. The first sub-operation block 211 may send a difference value between the real GELU function corresponding to the input and an approximation output value linearly processed based on the first LUT 1420 to the second sub-operation block 212.

In an embodiment of the disclosure, the first LUT 1420 of the first sub-operation block 211 may have the point number of four. For example, the first LUT 1420 may have the first point, the second point, the third point and the fourth point from left on the X-axis.

In an embodiment of the disclosure, the function processing block 210 may determine locations of two of four points included in the first LUT 1420 of the first sub-operation block 211 in substantially the same manner as the re-quantization operation. For example, the function processing block 210 may calculate locations of the two points in the first LUT 1420 of the first sub-operation block 211 by considering quantization of the GELU function. For example, the locations of the two points may have values that minimize an error of the detailed output value output by the second sub-operation block 212 when the second sub-operation block 212 receives a difference value between a real function and an approximation output value.

In an embodiment of the disclosure, the locations of the two points may have values of when the real function value corresponds to a value obtained by performing primary linearization on the GELU function. For example, the first sub-operation block 211 may set the first point in the first LUT 1420 to (0, 0). The setting of the first point in the first LUT 1320 to (0, 0) may be to consider the real value before the first sub-operation block 211 performs a quantization operation. The first sub-operation block 211 may set the real coordinates of the first point to a quantized value corresponding to (0, 0). For example, the first sub-operation block 211 may set the second point in the first LUT 1320 to (Xmax, Ymax).

In an embodiment of the disclosure, the first sub-operation block 211 may set locations of the four points included in the first LUT 1420. The first sub-operation block 211 may set the locations of the four points included in the first LUT 1420 in the coordinate system based on a relation between the scale of the first LUT 1420 and the scale of the second sub-operation block 212. The setting of the locations of the four points in the first LUT 1420 in the coordinate system may reduce an amount of information to be processed by the second sub-operation block 212. Hence, the setting of the four points in the first LUT 1420 in the coordinate system may further enhance accuracy in result of processing of the second sub-operation block 212.

In an embodiment of the disclosure, the second sub-operation block 212 may store a difference value between an approximation output value resulting from interpolation in the first sub-operation block 211 and the real GELU function value. The second sub-operation block 212 may output a detailed output value by processing the difference value. The second sub-operation block 212 may store a value with a precision having a certain number of bits larger than the number of bits of the detailed output value. Hence, the second sub-operation block 212 may output the detailed output value at a designated accuracy required by the function processing block 210.

In an embodiment of the disclosure, the final output block 220 may receive the approximation output value output by the first sub-operation block 211 and the detailed output value output by the second sub-operation block 212. The adder 1041 of the final output block 220 may generate a combined value of the approximation output value and the detailed output value. The second shift block 1042 of the final output block 220 may shift the combined value of the approximation output value and the detailed output value as many times as a set number of bits to fit the final output value. The MUX 1043 of the final output block 220 may receive the approximation output value, the detailed output value, and the combined value of the approximation output value and the detailed output value. The MUX 1043 may choose the combined value of the approximation output value and the detailed output value. Accordingly, the final output block 220 may output the combined value of the approximation output value and the detailed output value as a final output value.

In an embodiment of the disclosure, the function processing block 210 may process the ELU function by using the first and second sub-operation blocks 211 and 212. The ELU function is a function that has divergent output values in the positive section on the X-axis unlike the Sigmoid function and the tan h function. Hence, when the function processing block 210 processes the ELU function only with the second sub-operation block 212, accuracy in result values output from the function processing block 210 may be reduced to a critical value or less even when the saturation from the quantization is taken into account. Accordingly, the function processing block 210 may generate an approximation output value by primary approximation and linearization by performing a linear interpolation operation with the first sub-operation block 211 in the positive section of the X-axis. When the function processing block 210 generates the approximation output value, an amount of information stored in the second sub-operation block may be reduced. The function processing block 210 may generate a detailed output value by processing a difference value between the real ELU function and the approximation output value with the second sub-operation block 212. Accordingly, the function processing block 210 may obtain a final output value with an accuracy approximate to an actual operation.

Figure 15B:
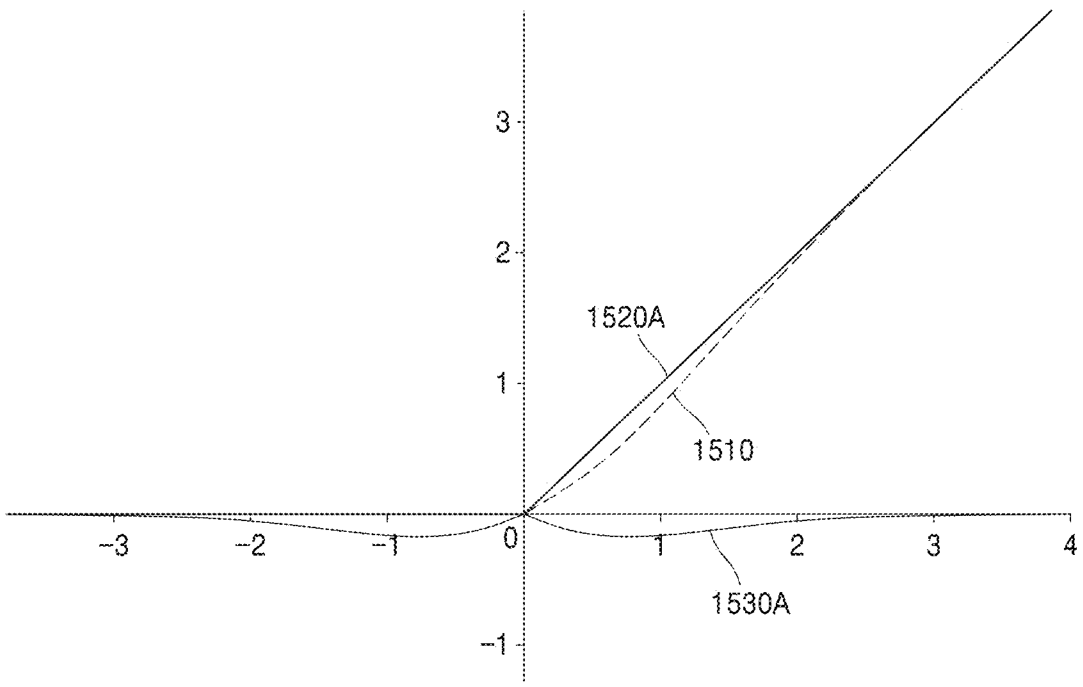
FIG. 15B illustrates inputs and outputs when a GELU function is input to a function processing block of an electronic device, according to an embodiment of the disclosure.

FIG. 15B is a graph representing inputs and outputs when an GELU function is input to the function processing block 210 of the electronic device 100, according to an embodiment of the disclosure. In FIG. 15B, represented are a real GELU function 1510 corresponding to an input, an approximation output value 1520A corresponding to an output of the first sub-operation block 211 (or an output of the first LUT 1520), and a detailed output value 1530A corresponding to an output of the second sub-operation block 212 (or an output of the second LUT 1530).

In an embodiment of the disclosure, the function processing block 210 may use the first and second sub-operation blocks 211 and 212 to reduce an output range required to represent a result of processing the GELU function. In a case that the second sub-operation block 212 alone processes the real GELU function 1510 corresponding to the input to obtain a result, an output range required to represent the processed result may correspond to the entire section having at least 0, which has a form that has a divergent maximum value without an upper limit. In an embodiment of the disclosure, the function processing block 210 of the electronic device 100 may use the detailed output value 1330A corresponding to the output of the second sub-operation block 212. Hence, the function processing block 210 may restrict a range of information to be stored by the second sub-operation block 212 to represent the result of processing the GELU function to within a certain range. In the case of restricting the range of information to be stored by the second sub-operation block 212 to within the certain range, a scale of a function processed by the second sub-operation block 212 may be reduced. Accordingly, the function processing block 210 may obtain a more accurate result of processing the GELU function.

Figure 16:
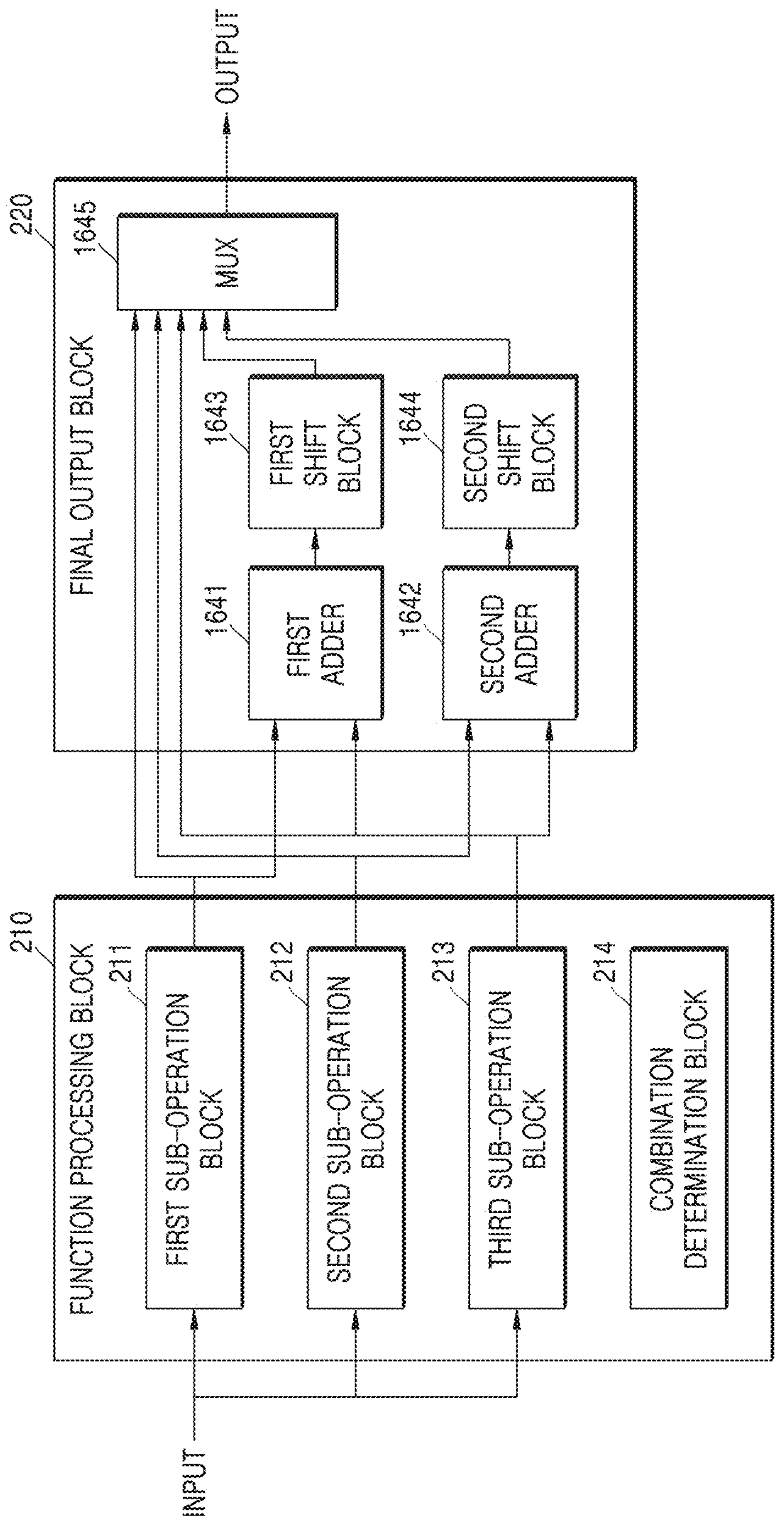
FIG. 16 illustrates an electronic device, according to an embodiment of the disclosure.

FIG. 16 is a block diagram illustrating the electronic device 100, according to an embodiment of the disclosure. In an embodiment of the disclosure, the electronic device 100 may include the function processing block 210 for performing approximation and operation on an input, and the final output block 220 for generating a final output by selecting and/or combining processing results.

In an embodiment of the disclosure, the function processing block 210 may include the first and second sub-operation blocks 211 and 212 and a third sub-operation block 213. It is not, however, limited thereto, and the function processing block 210 may include at least two sub-operation blocks to implement hardware of an activation function. When the number of sub-operation blocks included in the function processing block 210 increases, the activation function may be embodied more accurately. However, when the number of sub-operation blocks included in the function processing block 210 is higher than a required number of the sub-operation blocks, an area of a memory required to include the sub-operation blocks may increase.

In an embodiment of the disclosure, the first to third sub-operation blocks 211, 212 and 213 included in the function processing block 210 may have different point numbers and bit resolutions. For example, the first sub-operation block 211 may have the point number of 2 and a bit resolution of 24 bits. For example, the second sub-operation block 212 may have the point number of 16 and a bit resolution of 16 bits. For example, the third sub-operation block 213 may have the point number of 256 and a bit resolution of 8 bits. The first sub-operation block 211 may perform a ReQ operation, or may linearly approximate a ReLU function. The second sub-operation block 212 may perform primary linear approximation on a non-linear activation function. The third sub-operation block 213 may store a difference between a real value and an approximated value and generate a detailed output value.

In an embodiment of the disclosure, the function processing block 210 may include a combination determination block 214. The combination determination block 214 may select at least one activation block for generating a final output value from among the first to third sub-operation blocks 211, 212, and 213. The activation block may be used to generate a final output value among the first to third sub-operation blocks 211, 212, and 213. For example, in a case of sending the processing result to the final output block 220 by using the first and third sub-operation blocks 211 and 213, the at least one activation block may be the first and third sub-operation blocks 211 and 213. For example, in a case of sending the processing result to the final output block 220 by using the first to third sub-operation blocks 211, 212, and 213, the at least one activation block may be the first to third sub-operation blocks 211, 212, and 213.

In an embodiment of the disclosure, the combination determination block 214 may choose at least one activation block based on information relating to an activation function corresponding to the input and a required condition for a final output value. The required condition for a final output value may include output accuracy and an extent of output latency. The combination determination block 214 may store at least one candidate combination. The at least one candidate combination may be agreed to designate and use at least one activation block. For example, a first candidate combination of at least one candidate combination may be a first sub-operation block 211 and a second sub-operation block 212. For example, a second candidate combination of the at least one candidate combination may be first to third sub-operation blocks 211, 212, and 213. For example, when the combination determination block 214 is able to process the activation function corresponding to the input by using the first candidate combination, the combination determination block 214 may use the first candidate combination to process the input. For example, when determining that accuracy required for the final output value may be satisfied with the first candidate combination, the combination determination block 214 may use the first candidate combination to process the input.

In an embodiment of the disclosure, the function processing block 210 may embody a combination of activation functions agreed in advance to be used in the combination determination block 214. For a compiler of the function processing block 210 to support the operation operator, the information needs to be known in advance. Hence, for the compiler of the function processing block 210 to support the operation operator, only a combination of activation functions set in advance is available. For example, the combination of the activation functions agreed in advance to be used may be agreed in a compile procedure of the function processing block 210. For example, the combination of the activation functions agreed in advance to be used may be stored in the NPU 111.

In an embodiment of the disclosure, in relation to the sub-operation blocks (e.g., the first sub-operation block 211, the second sub-operation block 212, and the third sub-operation block 213) and the combination determination block 214 included in the function processing block 210, the configuration of the function processing block 210 may be dynamically changed by considering a situation condition such as an in/out tensor and an operator to be processed currently. For example, the configuration of the function processing block 210 may be dynamically calculated by an extra calculator included in the processor 110 (e.g., a system such as a CPU or a digital signal processor (DSP)) of the electronic device 100. For example, the configuration of the function processing block 210 may be generated in advance during compiling of the processor 110 of the electronic device 100 and stored in the memory 130 of the electronic device 100. For example, the configuration of the function processing block 210 may be stored in the memory 130 of the electronic device 100 and then moved to the accelerator 200 for use when needed. For example, the configuration of the function processing block 210 may be stored in the accelerator 200 in the form of an LUT. In the case of storing the configuration of the function processing block 210 in the LUT, the accelerator 200 may include an extra memory for storing the LUT. For example, the configuration of the function processing block 210 may be received from the processor 110 through an instruction and/or a file. For example, when the number of points that the sub-operation blocks included in the function processing block 210 have is equal to or smaller than a designated value, the configuration of the function processing block 210 may be included as a parameter in an instruction for controlling an operation of the accelerator 200. For example, when the number of points that the sub-operation blocks included in the function processing block 210 have is equal to or smaller than the designated value, the configuration of the function processing block 210 may be received from the processor 110 through an extra hardware configuration file (e.g., an MMREG header file).

In an embodiment of the disclosure, the final output block 220 may include a first adder 1641, a second adder 1642, a first shift block 1643, a second shift block 1644 and a MUX 1645. The first adder 1641 may combine an output value of the first sub-operation block 211 and an output value of the second sub-operation block 213. The second adder 1642 may combine an output value of the second sub-operation block 212 and an output value of the third sub-operation block 213. The first shift block 1643 may shift the operation result of the first adder 1641 to correspond to an output scale. The second shift block 1644 may shift the operation result of the second adder 1642 to correspond to a scale of an output 1650. The MUX 1645 may receive an output value of the first sub-operation block, an output value of the second sub-operation value, an output value of the third sub-operation block, a result value of the first shift block 1643 and a result value of the second shift block 1644. The MUX 1645 may choose one of the received values according to a given setting. For example, the MUX 1645 may bypass one of the output value of the first sub-operation block, the output value of the second sub-operation value, and the output value of the third sub-operation block, and determine it as an output. For example, the MUX 1645 may determine one of the result value of the first shift block 1643 and the result value of the second shift block 1644 as an output. To keep an accuracy of the output, the final output block 220 may form an output precision of each of the first to third sub-operation blocks 211, 212, and 213 to further secure a certain number of bits. The final output block 220 may generate a final output by combining two output values and shifting the result to keep the accuracy of the output.

In an embodiment of the disclosure, the electronic device 100 may include the NPU 111 for processing an input activation function and the accelerator 200 included in the NPU 111. In an embodiment of the disclosure, the accelerator 200 may include the function processing block 210 including at least one sub-operation block 211 and 212, and a final output block 220 connected to the function processing block 210. In an embodiment of the disclosure, the first sub-operation block 211 of the at least one sub-operation block 211 and 212 may calculate an approximation output value for the activation function by processing the activation function based on a first point number and a first bit resolution. In an embodiment of the disclosure, the second sub-operation block 212 of the at least one sub-operation block 211 and 212 may calculate a detailed output value for the activation function by processing the activation function based on a second point number and a second bit resolution. In an embodiment of the disclosure, the final output block 220 may calculate a final output value corresponding to the activation function based on the approximation output value and the detailed output value.

In an embodiment of the disclosure, the first sub-operation block 211 may include the first ReQ block 310, the first LUT 320 having the first point number and the first bit resolution, and the first interpolation block 330. In an embodiment of the disclosure, the second sub-operation block 212 may include the second ReQ block 340, the second LUT 350 having the second point number and the second bit resolution, and the second interpolation block 360.

In an embodiment of the disclosure, the second point number may be larger than the first point number, and the second bit resolution may be lower than the first bit resolution.

In an embodiment of the disclosure, the first sub-operation block 211 may receive an activation function, adjust a scale of the activation function to fit the first point number, and generate an approximation output value interpolated based on a value stored in the first LUT 320 or the first bit resolution of the first LUT 320.

In an embodiment of the disclosure, the second sub-operation block 212 may receive a difference value between the activation function and the approximation output value, shift the difference value to fit the second point number of the second LUT, and generate a detailed output value based on a value stored in the second LUT 350.

In an embodiment of the disclosure, the approximation output value and the second sub-operation block 212 may have a relation of 2 to the power of 2.

In an embodiment of the disclosure, the second sub-operation block 212 may use the approximation output value as an input.

In an embodiment of the disclosure, the function processing block 210 may further include the combination determination block 214 for selecting at least one activation block from among at least one sub-operation block to generate a final output value. In an embodiment of the disclosure, the combination determination block 214 may choose at least one activation block based on information relating to an input activation function and a required condition for the final output value.

According to an embodiment of the disclosure, a method of controlling the electronic device 100 including the function processing block 210 and the final output block 220 may include controlling the first sub-operation block 211 of at least one sub-operation block included in the function processing block 210 to calculate an approximation output value for an activation function by processing the activation function based on a first point number and a first bit resolution, in operation 610. The method of controlling the electronic device 100 including the function processing block 210 and the final output block 220 may include controlling the second sub-operation block 212 of the at least one sub-operation block to calculate a detailed output value for the activation function by processing the activation function based on a second point number and a second bit resolution, in operation 620. The method of controlling the electronic device 100 including the function processing block 210 and the final output block 220 may include controlling the final output block 220 to calculate a final output value corresponding to the activation function based on the approximation output value and the detailed output value, in operation 630.

In an embodiment of the disclosure, the second point number may be larger than the first point number, and the second bit resolution may be lower than the first bit resolution.

In an embodiment of the disclosure, the controlling of the first sub-operation block 211 to calculate the approximation output value may include receiving, by the first sub-operation block 211, the activation function in operation 710, adjusting, by the first sub-operation block 211, a scale of the activation function to fit the first point number of a first LUT included in the first sub-operation block 211 in operation 720, and generating, by the first sub-operation block 211, an approximation output value interpolated based on a value stored in the first LUT or the first bit resolution of the first LUT in operation 730.

In an embodiment of the disclosure, the controlling of the second sub-operation block 212 to calculate the detailed output value may include receiving, by the second sub-operation block 212, a difference value between the activation function and the approximation output value in operation 810, shifting, by the second sub-operation block 212, the difference value to fit the second point number of the second LUT included in the second sub-operation block 212 in operation 820, and generating, by the second sub-operation block 212, a detailed output value based on a value stored in the second LUT in operation 830.

In an embodiment of the disclosure, the approximation output value and the second sub-operation block 212 may have a relation of 2 to the power of 2.

In an embodiment of the disclosure, the second sub-operation block 212 may use the approximation output value as an input.

In an embodiment of the disclosure, the method may further include selecting, by the combination determination block 214 included in the function processing block 210, at least one activation block from the at least one sub-operation block to generate the final output value. In an embodiment of the disclosure, the combination determination block 214 may choose at least one activation block based on information relating to an input activation function and a required condition for the final output value.

According to an embodiment of the disclosure, a recording medium for storing at least one instruction for controlling the electronic device 100 including the function processing block 210 and the final output block 220 is provided, wherein the at least one instruction may carry out an operation to control a first sub-operation block of at least one sub-operation block included in an operation block to calculate an approximation output value for an activation function by processing the activation function based on a first point number and a first bit resolution, In an embodiment of the disclosure, the at least one instruction may carry out an operation to control a second sub-operation block of the at least one sub-operation block to calculate a detailed output value for the activation function by processing the activation function based on a second point number and a second bit resolution. In an embodiment of the disclosure, the at least one instruction may carry out an operation to control a final output block to calculate a final output value corresponding to the activation function based on the approximation output value and the detailed output value.

In an embodiment of the disclosure, the second point number may be larger than the first point number, and the second bit resolution may be lower than the first bit resolution.

In an embodiment of the disclosure, the operation carried out by the at least one instruction for controlling the first sub-operation block to calculate the approximation output value may include receiving, by the first sub-operation block, the activation function, adjusting, by the first sub-operation block, a scale of the activation function to fit the first point number of a first LUT included in the first sub-operation block, and generating, by the first sub-operation block, an approximation output value interpolated based on a value stored in the first LUT or the first bit resolution of the first LUT.

In an embodiment of the disclosure, the operation carried out by the at least one instruction for controlling the second sub-operation block to calculate the detailed output value may include receiving, by the second sub-operation block, a difference value between the activation function and the approximation output value, shifting, by the second sub-operation block, the difference value to fit the second point number of the second LUT included in the second sub-operation block, and generating, by the second sub-operation block, the detailed output value based on a value stored in the second LUT.

In an embodiment of the disclosure, the approximation output value and the second sub-operation block 212 may have a relation of 2 to the power of 2.

According to the disclosure, an electronic device and method for controlling the same adds an accelerator for processing a non-linear activation function to an NPU, enabling the processor to omit an extra operator for processing the non-linear activation function, thereby gaining an effect of reducing the size and complexity of the processor.

The method according to an embodiment of the disclosure may be implemented in program instructions which are executable by various computing means and recorded in computer-readable media. The computer-readable media may include program instructions, data files, data structures, etc., separately or in combination. The program instructions recorded on the computer-readable media may be designed and configured specially for the disclosure, or may be well-known to those of ordinary skill in the art of computer software. Examples of the computer readable recording medium include a magnetic medium such as a hard disk, a floppy disk and a magnetic tape, an optical medium such as a compact disc read-only memory (CD-ROM) and a digital versatile disc (DVD), a magneto-optical medium such as a floptical disk, and a hardware device specially configured to store and perform program instructions, such as a read-only memory (ROM), a random-access memory (RAM), a flash memory, etc. Examples of the program instructions include not only machine language codes but also high-level language codes which are executable by various computing means using an interpreter.

Some embodiments of the disclosure may be implemented in the form of a computer-readable recording medium that includes computer-executable instructions such as the program modules executed by the computer. The computer-readable medium may be an arbitrary available medium that may be accessed by the computer, including volatile, non-volatile, removable, and non-removable mediums. The computer-readable recording medium may also include a computer storage medium and a communication medium. The computer-readable medium includes all the volatile, non-volatile, removable, and non-removable mediums implemented by an arbitrary method or technology for storage of information, such as computer-readable instructions, data structures, program modules, or other data. The communication medium generally includes computer-readable instructions, data structures, program modules, or other data or other transmission mechanism for modulated data signals like carrier waves, and include arbitrary information delivery medium. Furthermore, some embodiments of the disclosure may be implemented in a computer program or a computer program product including computer-executable instructions.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a machine-readable storage medium (e.g., a CD-ROM) or distributed directly between two user devices (e.g., smart phones) or online (e.g., downloaded or uploaded). In the case of the online distribution, at least part of the computer program product (e.g., a downloadable app) may be at least temporarily stored or arbitrarily created in a storage medium that may be readable to a device such as a server of the manufacturer, a server of the application store, or a relay server.

What is claimed is:

1. An electronic device comprising:

a neural processing unit (NPU) configured to process an activation function; and an accelerator in the NPU, wherein the accelerator comprises:

a function processing block comprising at least one sub-operation block, and a final output block connected to the function processing block, wherein the at least one sub-operation block comprises:

a first sub-operation block configured to calculate an approximation output value for the activation function by processing the activation function based on a first point number and a first bit resolution, and a second sub-operation block configured to calculate a detailed output value for the activation function by processing the activation function based on a second point number and a second bit resolution, and wherein the final output block is configured to calculate a final output value corresponding to the activation function based on the approximation output value and the detailed output value.

2. The electronic device of claim 1, wherein the first sub-operation block comprises a first re-quantization (ReQ) block, a first lookup table (LUT) having the first point number and the first bit resolution, and a first interpolation block, and wherein the second sub-operation block comprises a second ReQ block, a second LUT having the second point number and the second bit resolution, and a second interpolation block.

3. The electronic device of claim 1, wherein the second point number is larger than the first point number, and wherein the second bit resolution is lower than the first bit resolution.

4. The electronic device of claim 2, wherein the first sub-operation block is configured to:

receive the activation function, adjust a scale of the activation function to correspond to the first point number of the first LUT, and generate the approximation output value interpolated based on a value stored in the first LUT or the first bit resolution of the first LUT.

5. The electronic device of claim 2, wherein the second sub-operation block is configured to:

receive a difference value between the activation function and the approximation output value, shift the difference value to fit the second point number of the second LUT, and generate the detailed output value based on a value stored in the second LUT.

6. The electronic device of claim 5, wherein the approximation output value and the second sub-operation block have a relation of 2 to the power of 2.

7. The electronic device of claim 6, wherein the second sub-operation block is configured to use the approximation output value as an input.

8. The electronic device of claim 7, wherein the function processing block comprises a combination determination block configured to select at least one activation block to generate the final output value from the at least one sub-operation block, and wherein the combination determination block is configured to select the at least one activation block based on information relating to the activation function and a required condition for the final output value.

9. A method of controlling an electronic device including a function processing block and a final output block, the method comprising:

calculating, by controlling a first sub-operation block of at least one sub-operation block in the function processing block, an approximation output value for an activation function by processing the activation function based on a first point number and a first bit resolution;

calculating, by controlling a second sub-operation block of the at least one sub-operation block, a detailed output value for the activation function by processing the activation function based on a second point number and a second bit resolution; and calculating, by controlling the final output block, a final output value corresponding to the activation function based on the approximation output value and the detailed output value.

10. The method of claim 9, wherein the second point number is larger than the first point number, and wherein the second bit resolution is lower than the first bit resolution.

11. The method of claim 9, wherein the calculating, the controlling the first sub-operation block, the approximation output value comprises:

receiving, by the first sub-operation block, the activation function, adjusting, by the first sub-operation block, a scale of the activation function to fit the first point number of a first lookup table (LUT) in the first sub-operation block, and generating, by the first sub-operation block, the approximation output value interpolated based on a value stored in the first LUT or the first bit resolution of the first LUT.

12. The method of claim 9, wherein the calculating, by controlling the second sub-operation block, the detailed output value comprises:

receiving, by the second sub-operation block, a difference value between the activation function and the approximation output value, shifting, by the second sub-operation block, the difference value to fit the second point number of the second LUT in the second sub-operation block, and generating, by the second sub-operation block, the detailed output value based on a value stored in the second LUT.

13. The method of claim 9, wherein the approximation output value and the second sub-operation block have a relation of 2 to the power of 2.

14. The method of claim 9, wherein the second sub-operation block is configured to use the approximation output value as an input.

15. The method of claim 9, further comprising selecting, by a combination determination block in the function processing block, at least one activation block to generate the final output value from the at least one sub-operation block, wherein the combination determination block is configured to select the at least one activation block based on information relating to the activation function and a required condition for the final output value.

16. A non-transitory recording medium having at least one instruction stored therein to control an electronic device including a function processing block and a final output block, the at least one instruction for causing the electronic device to perform operations of:

calculating, by controlling a first sub-operation block of at least one sub-operation block in the function processing block, an approximation output value for an activation function by processing the activation function based on a first point number and a first bit resolution;

calculating, by controlling a second sub-operation block of the at least one sub-operation block, a detailed output value for the activation function by processing the activation function based on a second point number and a second bit resolution; and calculating, by controlling the final output block, a final output value corresponding to the activation function based on the approximation output value and the detailed output value.

17. The non-transitory recording medium of claim 16, wherein the second point number is larger than the first point number, and wherein the second bit resolution is lower than the first bit resolution.

18. The non-transitory recording medium of claim 16, wherein the calculating, by controlling the first sub-operation block, the approximation output value comprises:

receiving, by the first sub-operation block, the activation function, adjusting, by the first sub-operation block, a scale of the activation function to fit the first point number of a first lookup table (LUT) in the first sub-operation block, and generating, by the first sub-operation block, the approximation output value interpolated based on a value stored in the first LUT or the first bit resolution of the first LUT.

19. The non-transitory recording medium of claim 16, wherein the calculating, by controlling the second sub-operation block, the detailed output value comprises receiving, by the second sub-operation block, a difference value between the activation function and the approximation output value, shifting, by the second sub-operation block, the difference value to fit the second point number of the second LUT in the second sub-operation block, and generating, by the second sub-operation block, the detailed output value based on a value stored in the second LUT.

20. The non-transitory recording medium of claim 16, wherein the approximation output value and the second sub-operation block have a relation of 2 to the power of 2.

* * * * *